(12) United States Patent
Schler

(10) Patent No.: US 12,330,893 B2
(45) Date of Patent: Jun. 17, 2025

(54) SECURE PACKAGE DELIVERY SYSTEM AND ASSOCIATED METHODS

(71) Applicant: Andrew Schler, Satellite Beach, FL (US)

(72) Inventor: Andrew Schler, Satellite Beach, FL (US)

(73) Assignee: Wicket Works, LLC, Satellite Beach, FL (US)

( * ) Notice: Subject to any disclaimer, the term of this patent is extended or adjusted under 35 U.S.C. 154(b) by 231 days.

(21) Appl. No.: 18/061,173

(22) Filed: Dec. 2, 2022

(65) Prior Publication Data

US 2023/0159286 A1 May 25, 2023

Related U.S. Application Data

(63) Continuation-in-part of application No. 17/096,608, filed on Nov. 12, 2020, now Pat. No. 11,536,079.
(Continued)

(51) Int. Cl.
*B65G 67/00* (2006.01)
*A47G 29/14* (2006.01)
(Continued)

(52) U.S. Cl.
CPC ........... *B65G 67/24* (2013.01); *A47G 29/141* (2013.01); *E05F 15/73* (2015.01); *E05F 15/77* (2015.01); *A47G 2029/149* (2013.01); *E05Y 2400/45* (2013.01); *E05Y 2400/66* (2013.01); *E05Y 2400/85* (2013.01); *E05Y 2999/00* (2024.05)

(58) Field of Classification Search
CPC .... E05F 15/73; E05F 15/77; E05Y 2201/434; E05Y 2201/684; E05Y 2400/32; E05Y 2400/40; E05Y 2400/44; E05Y 2400/664; E05Y 2400/85; E05Y 2800/71; E05Y 2900/131; A47G 29/20; A47G 29/22; A47G 29/124; A47G 2029/144; A47G 2029/1257; A47G 29/12095; A47G 29/141; A47G 29/1248; A47G 2029/149;
(Continued)

(56) References Cited

U.S. PATENT DOCUMENTS 11,224,302 B2 * 1/2022 Jeffs ....................... A47G 29/30
11,278,144 B2 * 3/2022 Vernal Silva ........ A47G 29/141
(Continued)

*Primary Examiner* — Chi Q Nguyen
(74) *Attorney, Agent, or Firm* — Mark Malek; Jonathan Staudt; Widerman Malek, PL

(57) ABSTRACT

A package delivery system for enhanced delivery receivals including a door access panel, a first housing, a controller, a wireless communication interface, a delivery handling device, a second housing, and a transfer device. The door access panel may accept delivery of packages via a passageway that may be formed in a door. The first housing may be attached to the door access panel. The first housing may be in communication with the passageway to house packages delivered through the door access panel. The controller may selectively move the door between the opened position and the closed position. The delivery handling device may be moveable between an engaged position and a disengaged position. The second housing may be carried by the delivery handling device to receive a package from the first housing. The transfer device may move the package from the first housing to the second housing.

32 Claims, 21 Drawing Sheets

Related U.S. Application Data

(60) Provisional application No. 62/966,819, filed on Jan. 28, 2020.

(51) Int. Cl.
*B65G 67/24* (2006.01)
*E05F 15/73* (2015.01)
*E05F 15/77* (2015.01)

(58) Field of Classification Search
CPC .. A47G 2029/145; H04N 7/183; G07F 17/00; G07C 9/00571; G07C 9/00896; G06Q 50/28
See application file for complete search history.

(56) References Cited

U.S. PATENT DOCUMENTS

| | | | |
|---|---|---|---|
| 11,346,150 B1 * | 5/2022 | Johnston | E06B 7/32 |
| 11,369,223 B2 * | 6/2022 | Plummer | A47G 29/141 |
| 11,426,020 B2 * | 8/2022 | Morgan | A47G 29/1245 |
| 11,432,670 B2 * | 9/2022 | Nakanishi | B64F 1/368 |
| 11,839,319 B1 * | 12/2023 | Parr | A47G 29/28 |
| 11,889,939 B1 * | 2/2024 | Limber | A47G 33/12 |
| 12,016,478 B2 * | 6/2024 | Newcomb | E05B 47/0001 |
| 2021/0289968 A1 * | 9/2021 | Fuentes | A47G 29/16 |
| 2022/0031105 A1 * | 2/2022 | Newcomb | G06Q 10/0836 |
| 2022/0058575 A1 * | 2/2022 | Moudy | G07F 9/002 |
| 2022/0079365 A1 * | 3/2022 | Lewis | A47G 29/20 |

* cited by examiner

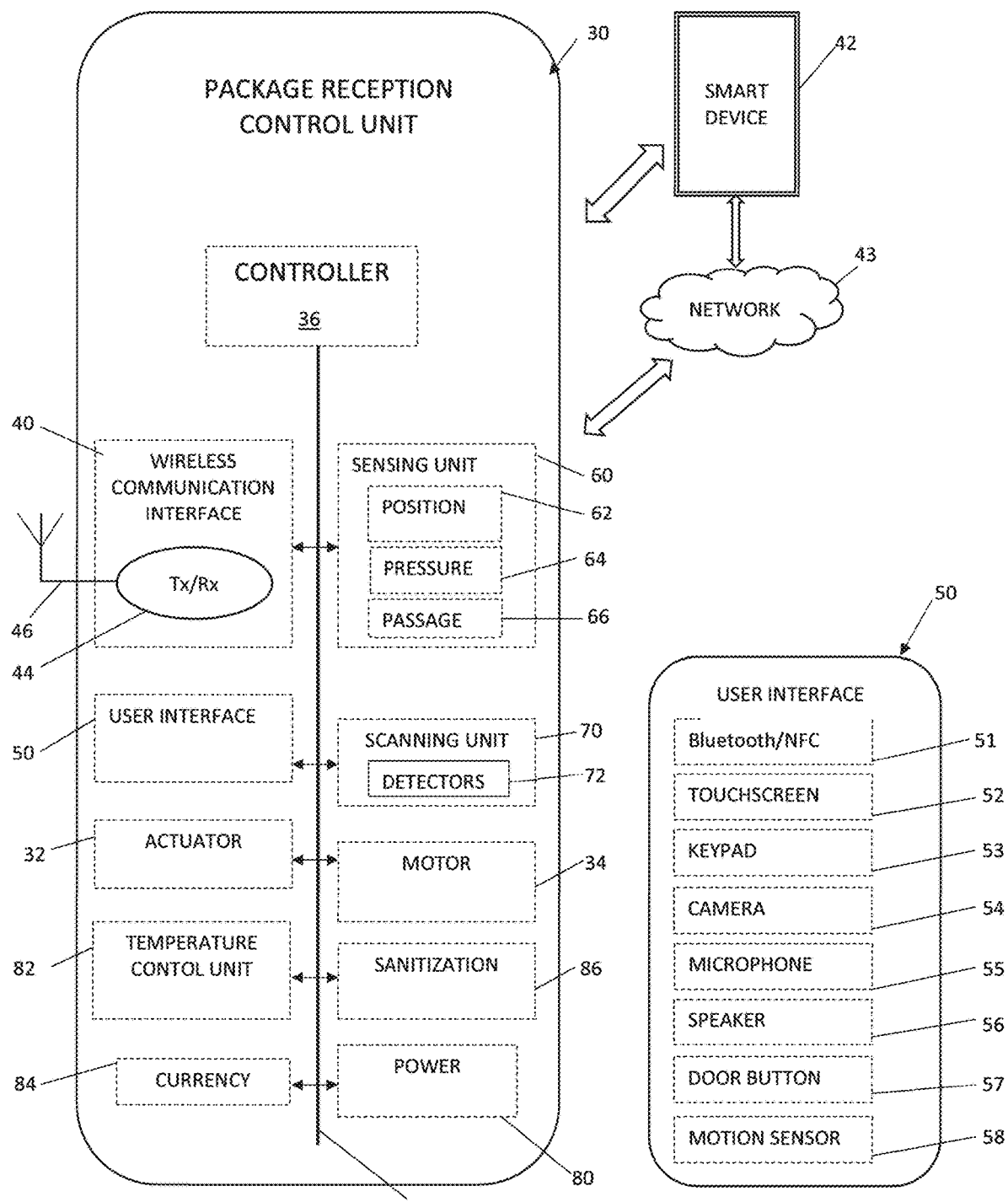

SECURE PACKAGE DELIVERY SYSTEM AND ASSOCIATED METHODS

RELATED APPLICATIONS

This application is a continuation-in-part of, and claims priority under 35 U.S.C. § 120 to U.S. patent application Ser. No. 17/096,608 filed on Nov. 12, 2020, issued on Dec. 27, 2022 as U.S. Pat. No. 11,536,079 and titled Secure Package Delivery System And Associated Methods which, in turn, claims priority under 35 U.S.C. § 119 (e) to U.S. Provisional Patent Application Ser. No. 62/966,819 filed on Jan. 28, 2020 and titled Secure Package Delivery System and Associated Methods, the entire contents of each of which is incorporated herein by reference except to the extent that the contents therein conflict with the contents herein.

FIELD OF THE INVENTION

The present invention relates to systems and methods for receiving package deliveries.

BACKGROUND OF THE INVENTION

Online shopping has resulted in more packages being delivered to homes and businesses. Packages may be delivered when the recipient is not present. The contents of the package may be valuable and/or important. Such packages delivered on a doorstep or other location outside of a residence are exposed to theft and/or damage from weather. Valuable packages may require a signature for security or require insurance against loss or theft. Such a signature requirement may complicate or delay the delivery when the recipient is unavailable to receive the shipment from the deliverer, which may result in additional costs.

Various approaches for securing delivered packages exist. For example, U.S. Pat. No. 10,653,262 to Israel is titled "Parcel securing assembly" and is directed to a parcel securing assembly that includes a box that is positionable on a horizontal support surface proximate an entrance to a building. The box has a delivery opening therein for receiving a delivered parcel. A door is hingedly coupled to the box and the door is aligned with the delivery opening for opening and closing the delivery opening. A locking unit is coupled to the box, and the locking unit is operationally coupled to the door. The locking unit is urgeable into a locked condition when the door is opened such that the locking unit locks the door when the door is subsequently closed. In this way the locking unit secures the delivered parcel in the box until an authorized user unlocks the locking unit.

U.S. Pat. No. 9,619,955 to Eichenblatt is titled "Systems and methods for facilitating package delivery or pickup" and is directed to a system for facilitating package delivery or pickup at premises of senders or recipients having a package door that is used for receipt and collection of packages. The package door includes an input device for entering package information and an image capture device for visually recording the arrival of a courier. The system may automatically unlock the package door if the package information matches a predetermined value. A user may remotely monitor the package information and/or information from the image capture device to determine whether to provide inputs for unlocking the package door.

Current package delivery approaches may be inconvenient and/or unreliable. Accordingly, there is a need for an improved package delivery experience. This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a package delivery system for enhanced delivery receivals. The system including a door access panel, a first housing, a controller, a wireless communication interface, a delivery handling device, a second housing, and a transfer device. The door access panel may accept delivery of packages via a passageway that may be formed in a door. The door access panel may be moveable between an opened position and a closed position.

The first housing may be attached to the door access panel. The first housing may be in communication with the passageway to house packages delivered through the door access panel. The controller may selectively move the door between the opened position and the closed position. The wireless communication interface may be in communication with the controller.

The delivery handling device may be moveable between an engaged position and a disengaged position. The engaged position of the delivery handling device may be defined as the delivery handling device being detachably engaged with the first housing. The disengaged position of the delivery handling device may be defined as the delivery handling device being disengaged and spaced apart from the first housing. The second housing may be carried by the delivery handling device to receive a package from the first housing, which may be when the delivery handling device is in the engaged position. The transfer device may move the package from the first housing to the second housing.

The second housing may include a temperature control unit and/or a sanitation unit. The temperature control unit may regulate a temperature within the second housing. The sanitation unit may sanitize an interior portion of the second housing and the package after the package has been transferred from the first housing to the second housing. The transfer device may include a conveyor that may be carried by the first housing. The conveyor may be operable by the controller to cause the conveyor to move the package from the first housing to the second housing.

The transfer device may include a grasping device that may be carried by the second housing. The grasping device may include a grasping portion to grasp at least a portion of the package and move the package from the first housing to the second housing. The system may include a docking station that may be sized to house the delivery handling device within the docking station. The docking station may be spaced apart from the door access panel. The docking station may include a charging station that may charge a power unit carried by the delivery handling device, which may be when the delivery handling device is in a docked position.

The system may further include a display that may be in communication with a camera. The display may be mounted on or adjacent to an interior face of the door. The camera may be positioned to view an environment adjacent to an outdoor facing portion of the door. The delivery handling device may include a motor that may be in mechanical communication with one or more traction members that may be positioned on a lower portion of the delivery handling device. The system may yet further include a smart device that may be in communication with the wireless communication interface, which the communication may be via a network. The smart device may be operable by a user to move the door access panel between the opened position and the closed position. The smart device may also be operable by the user to selectively control the delivery handling device.

BRIEF DESCRIPTION OF THE DRAWINGS

Some embodiments of the present invention are illustrated as an example and are not limited by the figures of the accompanying drawings, in which like references may indicate similar elements.

FIG. 2 is a schematic block diagram illustrating further details of a control unit of the package delivery system of FIG. 1.

FIG. 3 is a schematic block diagram illustrating further details of a user interface of the control unit for the package delivery system of FIG. 1

DETAILED DESCRIPTION OF THE INVENTION

Figure 1:
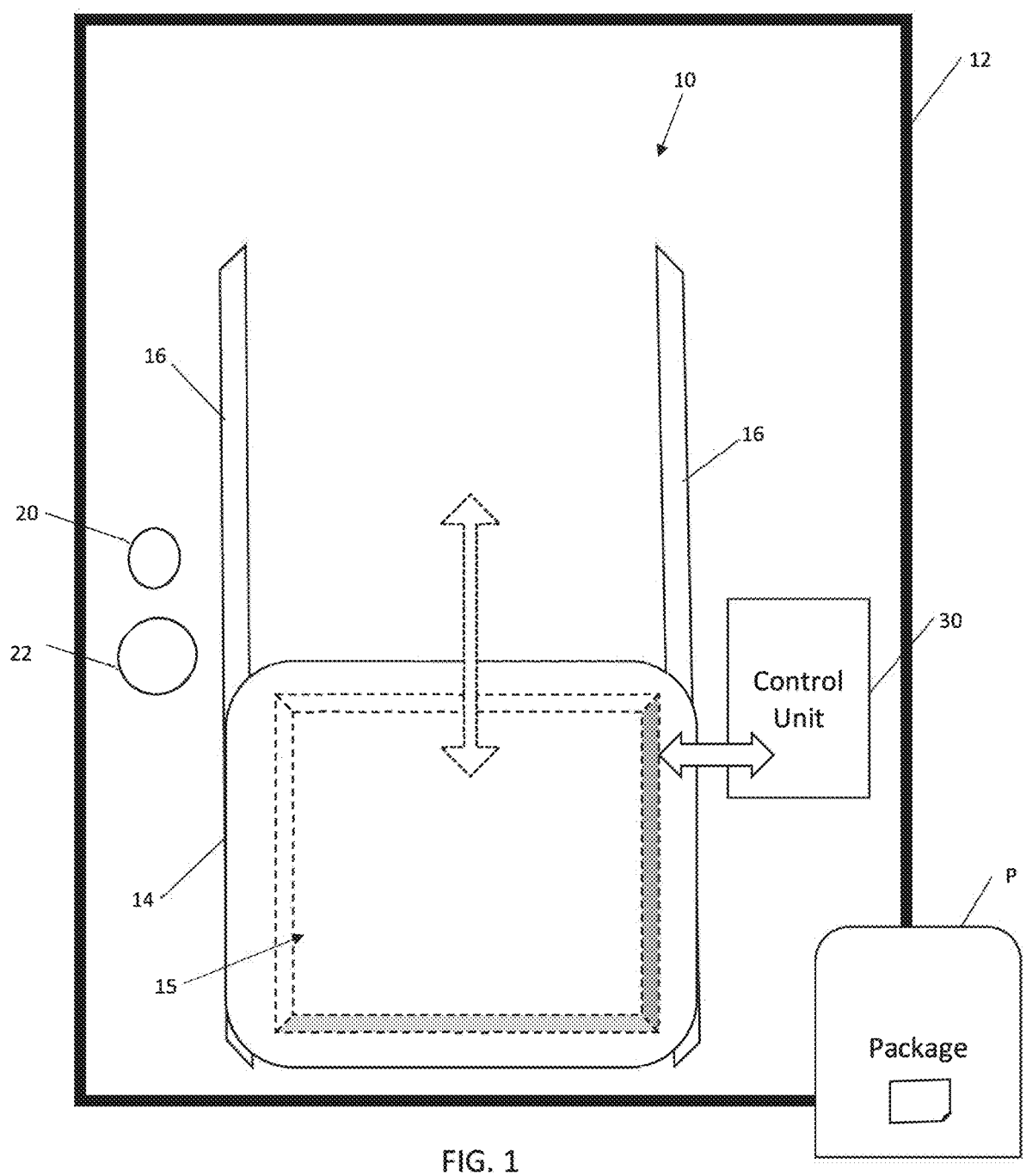
FIG. 1 is a schematic diagram showing a package delivery system according to an embodiment of the present invention and installed as a wicket in a typical entry door.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Before describing the present disclosure in detail, it is to be understood that this disclosure is not limited to parameters of the particularly exemplified systems, methods, apparatus, products, processes, and/or kits, which may, of course, vary. It is also to be understood that the terminology used herein is only for the purpose of describing particular embodiments of the present disclosure and is not necessarily intended to limit the scope of the disclosure in any particular manner. Thus, while the present disclosure will be described in detail with reference to specific embodiments, features, aspects, configurations, etc., the descriptions are illustrative and are not to be construed as limiting the scope of the claimed invention. Various modifications can be made to the illustrated embodiments, features, aspects, configurations, etc. without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While a number of methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "embodiment," "alternative embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the" include plural referents unless the content clearly dictates otherwise. Thus, for example, reference to a "sensor" includes one, two, or more sensors.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements have been used in various figures. In addition, similar elements and/or elements having similar functions may be designated by similar numbering. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein.

It is also noted that systems, methods, apparatus, devices, products, processes, compositions, and/or kits, etc., according to certain embodiments of the present invention may include, incorporate, or otherwise comprise properties, features, aspects, steps, components, members, and/or elements described in other embodiments disclosed and/or described herein. Thus, reference to a specific feature, aspect, steps, component, member, element, etc. in relation to one embodiment should not be construed as being limited to applications only within said embodiment. In addition, reference to a specific benefit, advantage, problem, solution, method of use, etc. in relation to one embodiment should not be construed as being limited to applications only within said embodiment.

The headings used herein are for organizational purposes only and are not meant to be used to limit the scope of the description or the claims. To facilitate understanding, like reference numerals have been used, where possible, to designate like elements common to the figures.

With reference to FIGS. 1-3, an embodiment of the invention, as shown and described by the various figures and accompanying text, provides a package delivery system 10 that can be used to receive packages at a residence or commercial property. The package delivery system 10 according to the present invention advantageously allows for packages to be delivered to a home or a place of business so that the package can be securely received and prevents the ever-increasing problem of packages being stolen from outside a door after delivery, i.e., "porch pirates."

As illustrated in FIGS. 1-3, the package delivery system 10 according to the present invention can be provided in any number of embodiments. For example, the package delivery system 10 can be provided within a door 12 having a delivery or door access panel 14 and passageway 15 installed therein. The present invention also contemplates embodiments of that provide a package delivery system 10 as a kit so that an existing door can be retrofitted to include the delivery panel 14 and other components. The panel 14 and passageway 15 may also be installed adjacent to the door 12, for example, in a wall.

The system 10 may include the door access panel 14 configured as a wicket to provide selective access to passageway 15 adjacent to, or within, the entry door 12, and being moveable between an open position and a closed position. A frame 16 is configured to be carried by the door 12 adjacent the passageway 15 and configured to movably mount the door access panel 14. The frame 16 may include at least one of rails, tracks and guides to provide slidable movement of the door access panel between the closed position and the open position.

A control unit 30 is associated with the panel 14 to control and operate the system 10. The control unit 30 includes an actuator 32 that is coupled to the door access panel 14, and a motor 34 that is coupled to the actuator 32 and configured to impart motion to the door access panel 14 via the actuator 32. The actuator 32 may include a gear, chain, cable, screw, lever and/or belt to transfer motive power between the motor 34 and the door access panel 14 to variably move the door access panel 14 between the open position and the closed position. A controller 36 is coupled to the motor 34 and configured to control selective actuation of the door access panel 14 via the motor 34 and actuator 32.

A wireless communication interface (WCI) 40 may be coupled to the controller 36 and configured to communicatively couple the controller 36 to a computer and/or smart device 42 of an authorized user for receiving a remote input to actuate, via the motor 34 and actuator 32, the door access panel 14 to move between the closed position and the open position. The wireless communication interface 40 may include a transceiver 44 and an antenna 46 configured to communicatively couple the control unit 30 to the smart device 42 and/or a local network 43 (e.g. WLAN, satellite or cellular network).

A user interface 50 may be coupled to the controller 36 and configured to receive local input for actuation of the door access panel 14 to move between the closed position and the open position. A sensing unit 60 may be coupled to the controller 36 and includes a position sensor 62 configured to generate position signals to the controller 36 with respect to the position of the door access panel 14. The sensing unit 60 may further include a pressure sensor 64 configured to generate pressure signals to the controller 36 with respect to a closing force of the door access panel 14 to aid in capture of an unauthorized intruder within the passageway 15. The sensing unit 60 may further include a passageway sensor 66 configured to generate passage signals to the controller 36 with respect to a passage of an object (e.g. the package P) through the passageway 15 while the door access panel 14 is in the open position. The sensing unit 60 and/or the passageway sensor 66 may be configured to generate the passage signals upon detecting that a package 92 has passed through and/or is present within the passageway 15. The passage signals may be emitted via a network 43. The smart device 42 may be configured to receive the passage signals via the network 43 and display a notification thereon the smart device 42 regarding the package(s) 92 being delivered.

A scanning unit 70 may be coupled to the controller 36 and includes detectors 72 configured to scan packages delivered through the passageway 15 for determining package parameters including package contents, dimensions, quantities, temperature, warnings, and/or sender information. A power source 80 is configured to provide power to the controller 36, motor 34 and all other powered components. The power source 80 may be wired to a property electrical system or may be battery powered as would be appreciated by those skilled in the art.

Additional features may include a temperature control unit 82 that is coupled to the controller 36 and configured to control the temperature of a delivered package P. A currency handler 84 may be coupled to the controller 36, positioned adjacent the door access panel 14, and configured to accept/dispense currency related to a delivery. Also, a sanitization unit 86 may be coupled to the controller 36, positioned adjacent the door access panel 14, and configured to sanitize a delivered package P. The controller 36 may be coupled to the other components within the control unit 30 via various channels, for example, including a communication bus 88.

FIG. 3 is a schematic block diagram illustrating further details of the user interface 50 of the control unit 30 for the package delivery system 10 of FIG. 1. The user interface 50 may include a Bluetooth communication device 51 (and/or a near-field communication (NFC) device), a touchscreen or display 52, and/or a keypad 53 to receive an authorization code as the local input for actuation of the door access panel 14 to move between the closed position and the open position. The user interface 50 may include a camera 54, microphone 55 and speaker 56 configured for visual and audio communication between a local deliverer at the door 12 and the smart device 42 of the authorized user. The user interface 50 may also include a door button 57, the keypad 53 and/or a motion sensor 58 configured to confirm the presence of the local deliverer at the door.

Thus, in an embodiment of the package delivery system 10 wherein a door 12 is being retrofitted with a delivery panel 14, a passageway 15 may first be cut into an existing door. The passageway 15 would be positioned so as not to interfere with a traditional deadbolt lock and 20 doorknob 22 of the door 12. After the passageway 15 is cut, the frame 16, to carry the delivery panel 14, is installed in the door 12. Similar to the passageway 15, the frame 16 is installed on the door 12 also so as not to interfere with the doorknob 22 and deadbolt lock 20 of the door. The frame 16 may be formed of metal, wood or synthetic materials, for example, and may be provided by angle iron, or any other type of material suitable for providing a frame that the delivery panel 14 may moveably engage. More specifically, the delivery panel 14 is moveable between an open position and a closed position. When in the open position, the delivery panel 14 may slide within the frame 16 so that access through the door 12 may be provided to allow for delivery of the package P within the residence or business. When in a closed position, the delivery panel 14 may slide within the frame 16 so that the passageway 15 in the door 12 is sealed and access to the property is secured.

The package delivery system 10 according to the present invention may include the motor 34 that is in communication with the moveable delivery panel 14. The motor 34 may, for example, be connected to a chain, other rope, or gear that may be connected between an actuator 32 and a portion of the panel 14. When the motor 34 is activated, the moveable delivery panel 14 may be moved between the open and the closed positions. The motor 34 is in communication with the controller 36 that is associated or embedded in the door 12 as part of the package delivery door system 10 according to embodiments of the present invention. The controller 36 and the motor 34 may be connected to a power source 30 that may also be carried by the door 12. It is contemplated that the controller 36 is also connectable to a wireless network so that signals may be transmitted from the controller 36 to a receiving device such as, for example, on the smart device 42 with a mobile application installed so that an authorized user may remotely connect to the controller 36 and may monitor and control the package delivery door system 10 of the present invention.

The package delivery door system 10 according to the present invention may also include the user interface 50 connected to the controller 36 and the power source 80. The user interface 50 may, for example, be provided by the touchscreen 52 or digital keypad 53 that allows for the motor 34 to be activated by entry of a unique code. The unique code, once entered, may allow for a signal to be sent from the user interface 50 to the motor 34 so that the motor 34 may be activated to move the delivery panel 14 to the opened position. Those skilled in the art will appreciate that the unique code that may be entered into the user interface 50 may be readily changeable. For example, the unique code may be changeable by the owner of the dwelling where the package is to be delivered or may be a rolling unique code that changes every predetermined period of time. In the case of a rolling code generation, the system 10 would also include a rolling code generator to provide a user with the unique code that is generated every predetermined period of time. Further, a delivery driver may also have access to the unique code generator or can be provided access to the unique code that is generated on the unique code generator by transmitting an alert to the owner of the dwelling that a package P is ready to be delivered.

The user interface 50 may also allow for activation of the motor 34 upon receipt of a signal. The signal may be provided, for example, by an access card that can be activated upon moving within a predetermined distance of the user interface 50. As such, the Bluetooth or near field communication device 51 may communicate with a delivery driver that has an NFC capability which is included on many mobile devices, so that the delivery driver may transmit a signal from the mobile device 42 to the motor 34 activator to move the panel 14 from the closed position to the open position. Other signal transmitters are also contemplated by the present invention that are suitable for transmitting a signal to the user interface 50 so that the delivery panel 14 can be moved between the closed position and the opened position.

As discussed, the package delivery system 10 according to the present invention may also include the camera 54 connected to the controller 36 and the power source 80. The camera 54 may, for example, include the passageway sensor 66 that senses movement in a vicinity of the door 12 and may activate to capture images or video of that which may be in front of the door 12 within the vicinity. Upon being activated, it is contemplated that the image or video may be sent to an authorized user. It is also contemplated that the camera 54 may also include a microphone 55 to capture audio within the vicinity when the camera is activated. Further, it is contemplated that a speaker 56 may be included in the package delivery door system 10 so that a user may transmit audio.

The camera 54 can be used to identify a delivery person and provide them access to deliver a package P through the moving panel 14. For example, when a person is within a defined vicinity of the camera 54, the motion sensor 58 may activate the camera 54 and automatically transmit captured images or video (via the controller 36) to the authorized user of the smart device 42 or one of the user interfaces 50, 144. The user may then transmit audio that can be heard by the delivery person to make inquiries regarding the package P. Upon being satisfied that the person within the defined vicinity is there to legitimately deliver a package, the authorized user may transmit a signal to the controller 36 which will activate the motor 34 to move the delivery panel 14 from the closed position to the opened position.

The camera 54 may also be used to provide the authorized user with notice that someone is accessing the premises through the delivery panel 14 that is not authorized to do so. For example, in a scenario where the delivery panel 14 was left in an open position, and it is determined that a person that is not authorized to access the premises is doing so through the passageway 14, the system 10 can include an emergency mode that will lower the delivery panel 14 and engage the unauthorized person.

It is contemplated that the system 10 will also include the pressure sensor 64 that is in communication with the controller 36 and that can lower the panel 14 to a predefined pressure. It is preferable that the predefined pressure is one that would restrain the unauthorized person, but not cause bodily harm to the unauthorized person. Further, the system 10 could be configured to automatically contact crime prevention authorities, e.g., police, should the emergency mode be activated by the authorized user, a signal would also be transmitted to local authorities to respond to the premises.

After the delivery person has passed the package P through the passageway 15 when the delivery panel 14 is in the opened position, the delivery panel 14 may automatically, via the controller 36, move to the closed position after a defined period of time that may be set by a user or that may be predefined. Alternatively, after identifying that the motion at the door 12 is from a delivery person, the authorized user may either provide a unique code to the delivery person that the delivery person can enter into the keypad 53 to move the delivery panel 14 between the closed position and the opened position. It is also contemplated that the package delivery system 10 may also include an option to close the panel upon completion of the delivery, i.e., the button 57 of the user interface 50 that is in communication with the controller 36 so that when the delivery person activates the button 57, the delivery panel 14 can be moved from the open position to the closed position.

It is also contemplated that the package delivery system 10 may include the position sensor 62 that informs an authorized user of the position of the delivery panel 14. The position sensor 62 may be carried by the frame 16 so that the position of the delivery panel 14 can be determined and a signal may be transmitted using the controller 36 to the authorized user via the WCI 40 and the smart device 42. The passageway sensor 66 may be carried by the frame 16 and may be used to sense when a package P has been passed through the passageway 15 exposed by the open delivery panel 14 and, upon sensing that the package P has passed through the passageway 15, can automatically close the delivery panel 14 via the controller 36. It is further contemplated that the authorized user may simply send a signal from a connected smart device 42 to the controller 36 to move the delivery panel 14 between the closed position and the open position.

The above embodiments of the present invention should be read in conformity with the embodiments of the present invention as they are described throughout below, except that for when the embodiments above conflict with the embodiments mentioned below, the below described embodiments will control.

Now referring to FIGS. 4, 6-8, and 10, the package delivery system 10 according to an embodiment of the present invention may be further discussed throughout below. The package delivery system 10 may include a door access panel 14, a control unit 30, a delivery handling device 94, and a docking station 96. The door access panel 14 may be installed in a passageway 15 formed through or within a door 12. The door access panel 14 may be configured to accept one or more packages 92 being delivered therethrough. A first housing 100 may be attached to the door access panel 14. The first housing 100 may be carried by and/or in communication with the passageway 15. The door access panel 14 may be configured to move between an opened position and a closed position.

The opened position of the door access panel 14 may be defined as when at least a portion of an interior the first housing 100 is visible from an outdoor environment 118. The opened position of the door access panel 14 may also, or alternatively, be defined as when the door access panel 14 is not substantially parallel to a vertical axis of the door 12. The closed position of the door access panel 14 may be defined as when the interior of the first housing 100 is not visible from the outdoor environment 118. The closed position of the door access panel 14 may also or alternatively be defined as when the door access panel 14 is substantially abutting against an outer perimeter of the passageway 15.

The door access panel 14 may include an actuator 32 and/or a motor 34 that may be operable move the door access panel 14 between the opened position and the closed position. The actuator 32 and the motor 34 may be in communication with the controller 36 of the package reception control unit 30. The controller 36 may control and/or operate the actuator 32 and the motor 34 to move the door access panel 14 between the opened position and the closed position. The package reception control unit 30 may include a wireless communication interface 40 that may be in communication with the controller 36 and with a network 43. The wireless communication interface 40 may also be configured to communicate by direct communication with other devices (not via the network 43). For example, without limitation, the wireless communication interface 40 may be in communication with other devices via Bluetooth, Ad-Hoc Wi-Fi, and/or Near-Field Communication (NFC).

Referring now to embodiments of the invention that are illustrated in FIGS. 4-22, the package delivery system 10 may include a delivery handling device 94. The delivery handling device 94 may be a robot and/or self-propelled device that may be used to obtain, carry, move, and/or house one or more packages 92 that have been delivered via the door access panel 14. The delivery handling device 94 may be moveable between an engaged position and a disengaged position. The engaged position may be defined as the delivery handling device 94 being detachably engaged with the first housing 100 of the door access panel 14. The engaged position may also or alternatively be defined as when the delivery handling device 94 being detachably engaged with the door access panel 14.

The system 10 may include one or more attachment points 114 positioned on the first housing 100, on the delivery handling device 94, on a second housing 102 carried by the delivery handling device 94, and/or on an interior face of the door 120 adjacent to the passageway 15. The attachment points 114 may facilitate the delivery handling device 94 detachably engaging the first housing 100 and/or the door access penal 14 when the delivery handling device 94 is in the engaged position. The attachment points 114 may be configured to detachably engage one another. A third housing 146 carried by a docking station 96 may also include attachment points 114 thereon to facilitate the delivery handling device 94 moving a package 92 into the third housing 146. The third housing 146 and docking station 96 are described in greater detail below.

The delivery handling device 94 may include a second housing 102 that may be used to house and/or carry the packages 92 that are delivered via the door access panel 14 and the passageway 15. The delivery handling device 94 and/or the second housing 102 may also include a sanitation unit 86, a temperature control unit 82, and a transfer device 104. The sanitation unit 86 may be configured to sanitize a portion of an interior of the second housing 102 and/or any packages 92 that may be within the second housing 102. The temperature control 82 unit may be configured to control the temperature of the interior of the second housing 102 and the packages 92 that may be within the second housing 102. The temperature control unit 82 may be configured to create heat, remove heat, and/or otherwise control the temperature of the interior of the second housing 102 and/or the packages 92 that may be within the second housing 102.

Some embodiments of the present invention may include a transfer device 104. The transfer device 104 may be carried by the delivery handling device 94, by one of the housings 100, 102, by the door access panel 14, and/or by the passageway 15. The transfer device 104 may be configured to move one or more packages 92 between the housings 100, 102, 146, or from one area to another area, such as, and without limitation from an interior of the passageway 15 to one of the housings 100, 102, 146. The transfer device 104 may comprise a grasping device 108 and/or a conveyor 106. The grasping device 108 may include a grasping portion 142. The grasping device 108 and/or the grasping portion 142 of the grasping device 108 may be configured to grasp a portion of the package 92 to move the package from one place to another, such as, from the first housing 100 to another housing 102, 146. The conveyor 106 may comprise of a conveyor belt that may be configured to rotatably move so as to move the package 92 from one place to another, such as, from the first housing 100 to another housing 102, 146. Alternatively, in some embodiments, the conveyer belt 106 may comprise of rollers, a tilting table, and/or an angle adjustable slider table be configured to move the package 92 from one place to another, such as, from the first housing 100 to another housing 102, 146.

Figure 5:
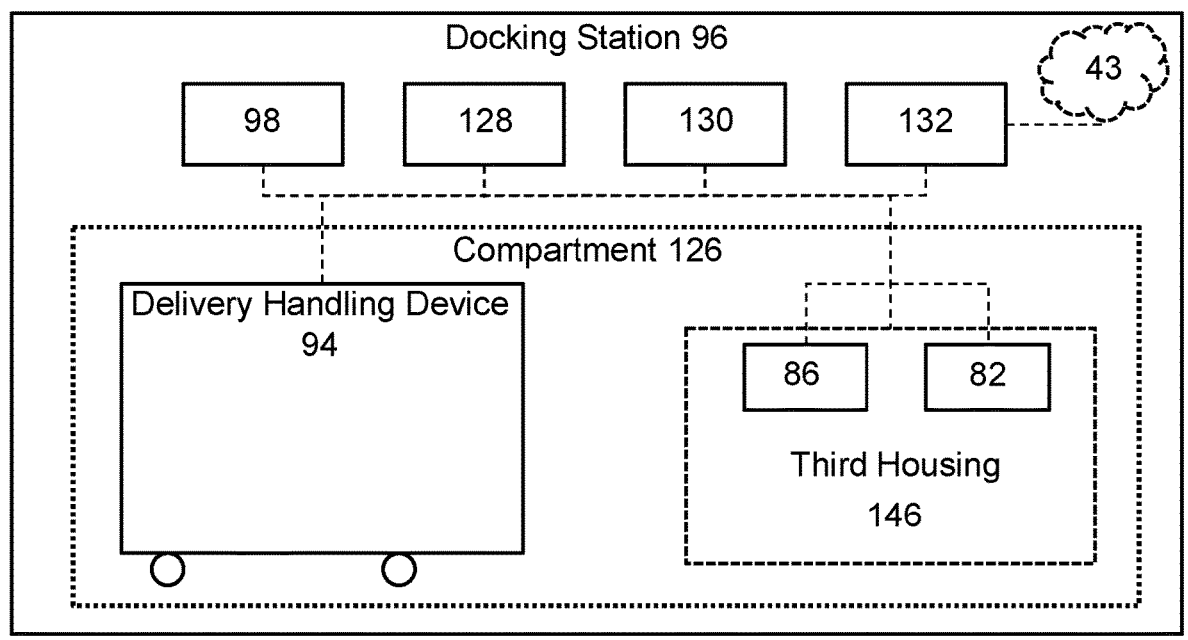
FIG. 5 is a schematic diagram of a docking station with a delivery handling device and a housing therein according to an embodiment of the present invention.
Figure 6:
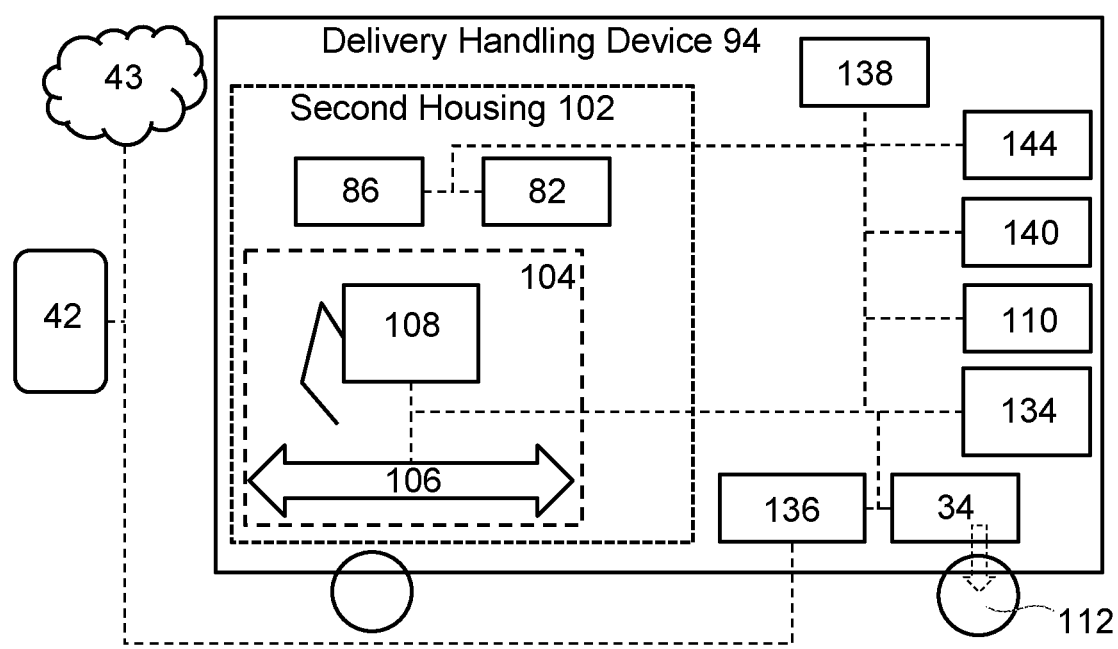
FIG. 6 is a schematic diagram of a delivery handling device in communication with a network and with a smart device according to an embodiment of the present invention.
Figure 7:
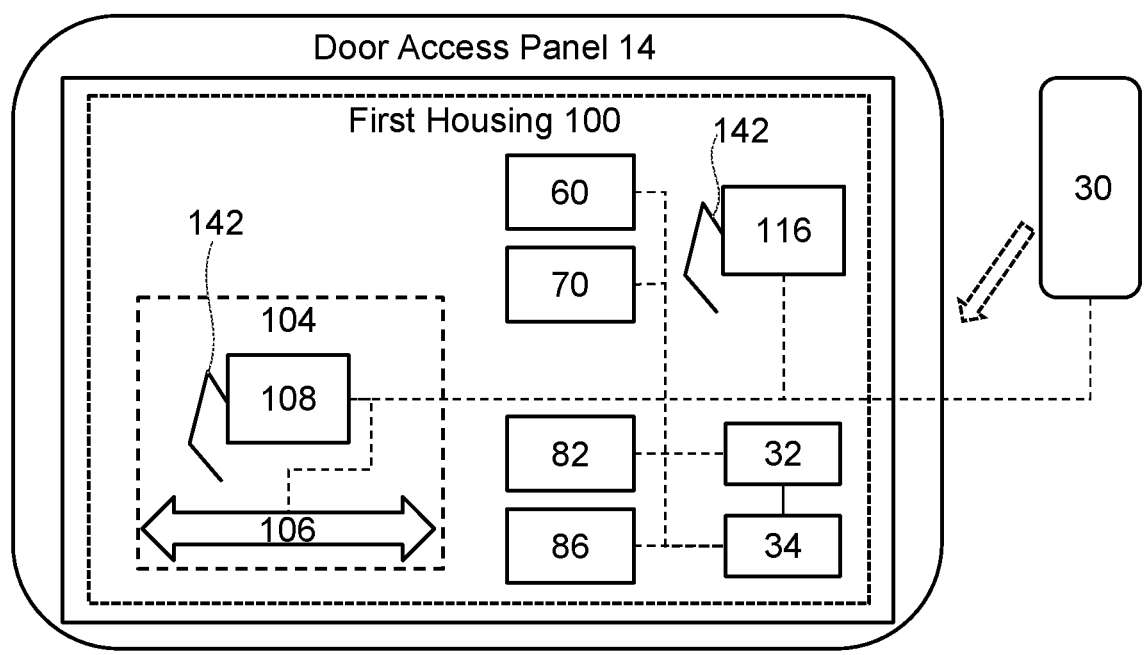
FIG. 7 is a schematic diagram of a door access panel in communication with a package reception control unit according to an embodiment of the present invention.
Figure 19:
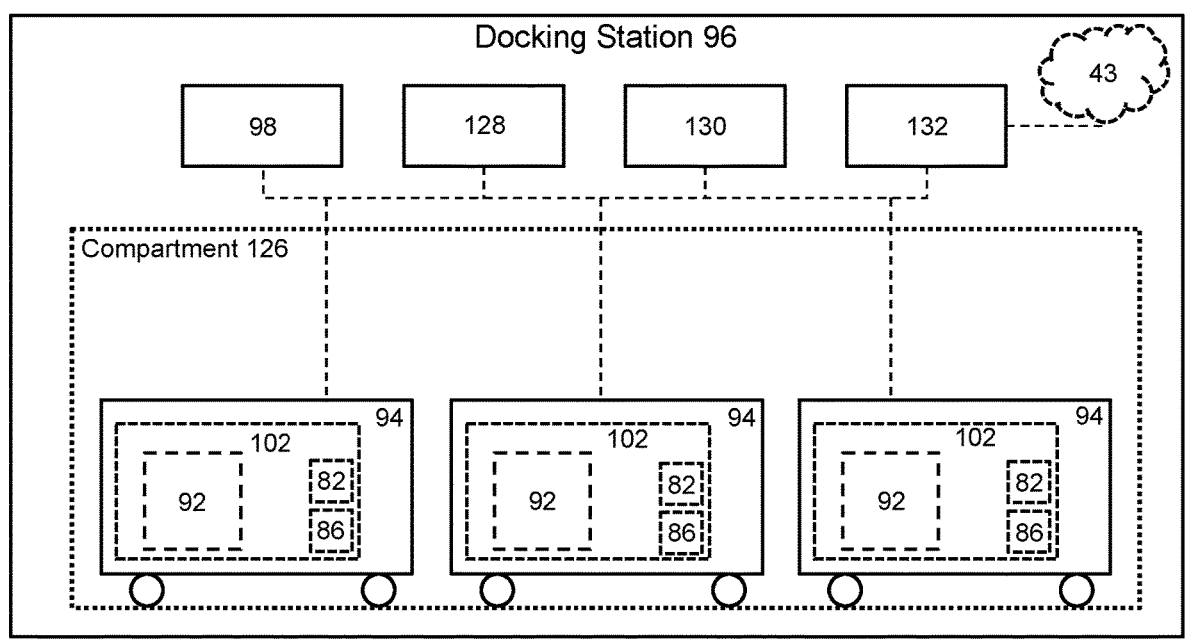
FIG. 19 is a schematic diagram of a docking station according to an embodiment of the present invention, showing multiple delivery handling devices carrying packages docked within the docking station.

Now referring to FIGS. 5 and 19, some embodiments of the present invention may include a docking station 96. The docking station 96 may be used as a container and/or housing to store and/or house one or more delivery handling devices 94. The docking station 96 may also contain a third housing 146 that may be used as a housing for packages 92, as illustratively shown in FIG. 5. The third housing 146 of the docking station 96 may contain a sanitation unit 86 and/or a temperature control unit 82. The docking station 96 may be a decorative piece of furniture that may be aesthetically pleasing to the eye, or it may be designed to be less noticeable when placed in an area. For example, without limitation, the docking station 96 may resemble a cabinet, a credenza, an end table, a chest, and/or a T.V. stand. The docking station 96 may be spaced apart from the door 12 such that it may be a separate member that is not physically attached to and/or not adjacent to the door access panel 14 or the door 12.

The docking station 96 may include a charging station 98, a power regulator 128, a compartment controller 130, and/or a dock communicator 132. The charging station 98 may be in communication with a power source 80 and with a power regulator 128. The charging station 98 may be configured to be in detachable communication with delivery handling devices 94 to charge a power unit 110 that may be carried by the delivery handling devices 94. Charging the delivery handling devices 94 and/or the power units 110 may be via the power regulator 128 of the docking station 96 and/or a power port 110 carried by the delivery handling device 94. The power regulator 128 may be in communication with the charging station 98 and may be configured to be in detachable communication with a delivery handling device 94 to regulate a power, voltage, and/or an amplitude of electrical power being transferred to the delivery handling device 94 and/or the power unit 110 of the delivery handling device. Further details on the power regulator 128, power port 140, and power unit 110 follows throughout below.

The docking station 96 may include a compartment 126. The compartment 126 may be configured and/or sized to house or contain one or more delivery handling devices 94. The compartment 126 may also contain one or more third housings 146 that may be used to carry and/or house packages 92 that may be placed within one of the third housings 146 by a delivery handling device 94. The docking station 96 may also include a compartment controller 130 that may be in communication with the charging station 98, the power regulator 128, and with the dock communicator 132. The compartment controller 130 may comprise a computational device, and may be used to operate, control, and/or monitor that activity and actions of the charging station 98, the power regulator 128, and the dock communicator 132.

The dock communicator 132 may be in communication with the compartment controller 130 and with a network 43. The communication between the dock communicator 132 and the network 43 may comprise either or both of a wired and wireless communication connection. The dock communicator 132 may be configured to send and receive computer readable information, data, and instructions. For example, without limitation, the dock communicator 132 may be configured to send and receive computer readable information, data, and instructions from the compartment controller 130, the delivery handling device 94, a handling device controller 134, a handling device communicator 136, the package reception control unit 30, a package delivery drone 90, and/or a smart device 42. Additionally, the dock communicator 132 may be configured to be in direct communication with the above-mentioned components, members, and/or devices, such as, via Bluetooth, Ad Hoc Wi-Fi, and near field communication (NFC).

The docking station 96 may include one or more station doors that may be sized to cover at least a portion of the compartment 126. The station doors may be in communication with the compartment controller 130 and may be configured to move between an opened position and a closed position upon receiving a door command signal from the compartment controller 130 and/or from the smart device 42. The station doors may include one or more motors and actuators that may be used to facilitate the station doors being moved between the opened position and the closed position.

Figure 4:
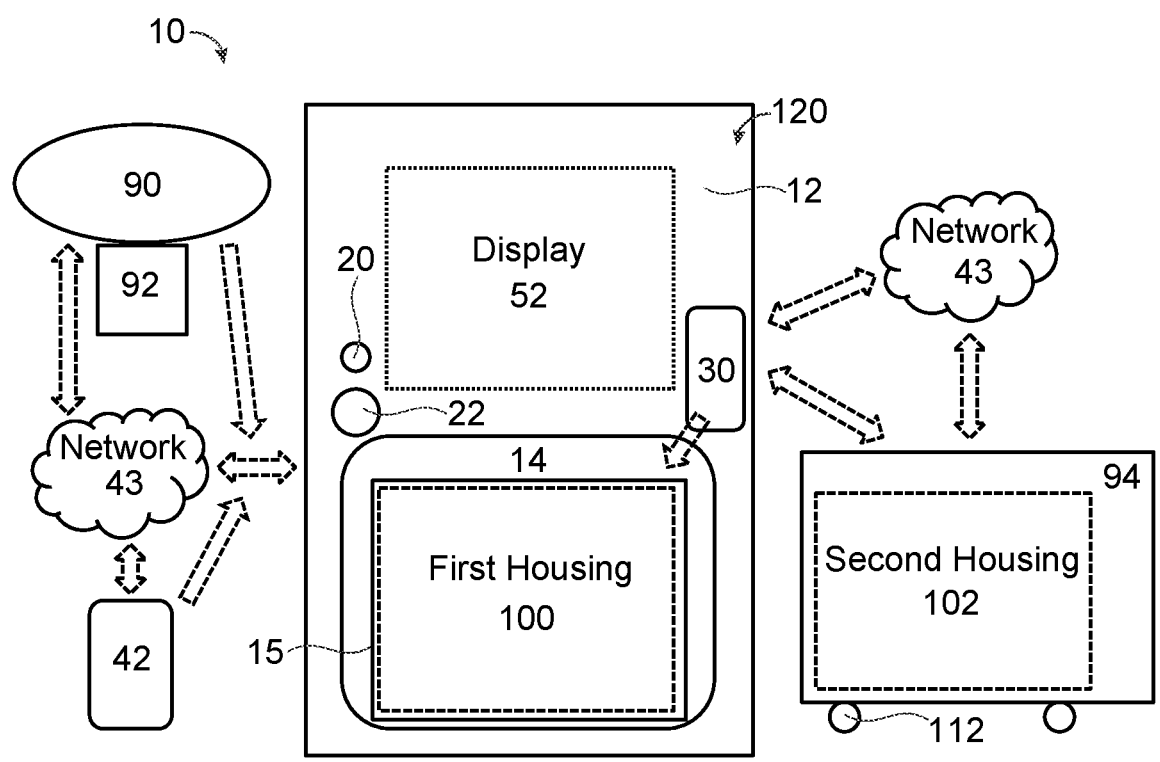
FIG. 4 is a schematic diagram of a package delivery system according to an embodiment of the present invention showing the interior face of the door.
Figure 9:
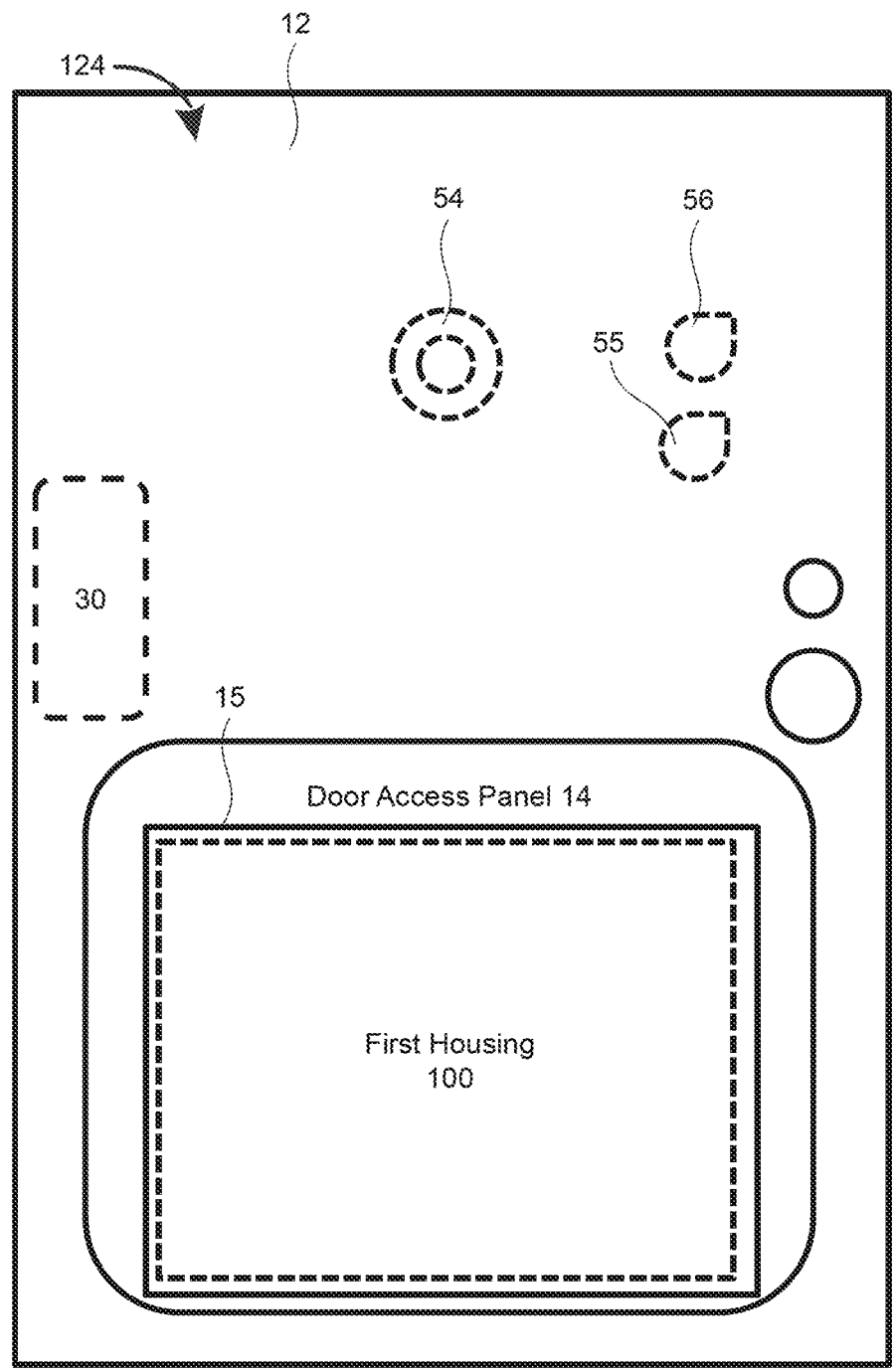
FIG. 9 is a schematic diagram of the door according to FIG. 4, showing the outdoor facing portion of the door.

Now referring to FIGS. 4 and 9, an embodiment of the present invention may include a camera 54, a display 52, a speaker 56, and a microphone 55. The camera 54, speaker 56, and the microphone 55 may be positioned on and/or attached to the outdoor facing portion of the door 124. The display 52 may be mounted on or adjacent to the interior face of the door 120. The camera 54 may be coupled in communication with the display 52. The display 52 may be configured to display a live stream video that may be sent to it from the camera 54.

The camera 54 may be positioned and/or configured to visually capture an outdoor environment 118 that may be adjacent to the outdoor facing portion of the door 124. The display 52 may also be in communication the package reception control unit 30 and/or the network 43. The display 52 may be configured to display one or more informational parameters, including but not limited to, weather, wind speed, estimated delivery arrival, delivery notifications, temperature of an interior of one of the housings 100, 102, 146, error messages, and/or warning messages. In some embodiments of the present invention, a camera 54 may be positioned within the first housing 100 that may be attached to the delivery access panel 14. The camera 24 may also be configured to have additional functionality, including but not limited to, zooming functions and/or infrared detection.

Now referring to FIGS. 4-6 and 10-22, the delivery handling device 94 may be configured to be self-propelled such that it may be mobile to move from one area to another area. The delivery handling device 94 may include one or more traction members 112 that may be positioned and/or attached to a lower portion of the delivery handling device 94. The traction members 112 may be configured to be controllably moved by a motor 34 such that the traction member 112 cause the delivery handling device 94 to be mobile. The traction members 112 may comprise wheels, castors, tracks, and/or legs. The traction members 112 may be in mechanical communication with one or more motors 34. In some embodiments of the present invention the traction member(s) 112 may be configured to be retractable.

The motors 34 may be carried by the delivery handling device and be in mechanical communication with one or more of the traction members 112. The motors 34 may be configured to facilitate and/or cause the traction members 112 to controllably move to such that the delivery handling device 94 may be mobile and/or self-propelled. The motors 34 of the delivery handling device 94 may be in communication with the power unit 110, the handling device controller 134, and the handling device communicator 136. The motors 34 of the delivery handling device 94 may be configured to be powered and/or controllably operated by the power unit 110, the handling device controller 134, and the handling device communicator 136. The motors 34 may comprise electric motors, such as, brushed or brushless electric motors. The motors 34 may be in communication with, and configured to be controlled by, the controller 36, the navigation unit 138, the handling device controller 134, and/or the smart device 43, which may be via the network 43.

The power unit 110 may be carried by the delivery handling device 94. The power unit 110 may be in communication with the transfer device 104, the grasping device 108, and conveyor 106, the sanitation unit 86, the temperature control unit 82, a navigation unit 138, a handling device user interface (UI) 144, the power port 140, the handling device controller 134, the motor 34, and the handling device communicator 136. The power unit 110 may be configured to provide and/or store electrical power. The power unit 110 may be configured to receive electrical power from and/or send electrical power to the transfer device 104, the grasping device 108, and conveyor 106, the sanitation unit 86, the temperature control unit 82, the navigation unit 138, the handling device user interface (UI) 144, the power port 140, the handling device controller 134, the motor 34, and the handling device communicator 136. The power unit 110 may comprise one or more batteries or power storage devices. The power storage unit 110 may also be configured to be dischargeable and rechargeable with electrical power.

The delivery handling device 94 may also include a navigation unit 138, a handling device UI 144, and a power port 140. The navigation unit 138 may be carried by the delivery handling device 94. The navigation unit 138 may be coupled in communication with the handling device controller 134, the handling device communicator 136, the traction members 112, and/or the motors 34 of the delivery handling device 94. The navigation unit 138 may be configured to selectively control the operation and actions of the motors 34 and/or the traction members 112. The navigation unit 138 may also be configured to detect and/or determine the position of the delivery handling device 94 relative to objects nearby or adjacent to the delivery handling device 94 and/or spatially relevant to an environment that the delivery handling device 94 may be within. The navigation unit 138 may also be configured to use global positioning satellites (GPS) to detect and/or determine the geographic position of the delivery handling device 94.

The power port 140 may be carried by the delivery handling device 94, and the power port 140 may be in communication with the power unit 110. The power port 140 may be configured to be detachable engageable with the charging station 98 and/or the power regulator 128 of the docking station 96. The power port 140 may be configured to facilitate the transfer of electrical power to the power unit 110 from the charging station 98 and/or the power regulator 128.

The handling device UI 144 may be carried by the delivery handling device 94. The handling device UI 144 may also be positioned on a surface of the delivery handling device 94. The handling device UI 144 may comprise a display that may be a touch-screen display. The handling device UI 144 may be configured to display one or more parameters and/or the current statuses, for example, without limitation, power level of the power unit 110, delivery status of one or more packages 92, status of the temperature control unit 82 and the sanitation unit 86, errors, and warnings. The handling device UI 144 may be interactive with a user so that the handling device UI 144 may register inputs made by a user with the handling device UI 144, and the handling device UI 144 may emit a user input signal relating to the inputs made by a user with the handling device UI 144. The user input signal may be received by the handling device controller 134 to cause the delivery handling device 94 to take a predetermined action including, without limitation, return the delivery handling device to the docking station 96, change the temperature levels of the temperature control unit 82, activate/deactivate the sanitation unit 86, relocate the delivery handling device 94 to another area by the motors 34 and/or traction units 112, have the delivery handling device 94 receive a package 92 that has been delivered via the door access panel 14, and/or power on/off the delivery handling device 94.

The handling device communicator 136 may be carried by the delivery handling device 94, and the handling device communicator 136 may be coupled in communication with the navigation unit 138, the handing device UI 144, the handling device controller 134, the network 43, and one or more smart devices 42, which the communication by be via a wired or wireless communication connection. The handling device communicator 136 may be configured to send, receive, and/or facilitate the transfer of computer readable data, instruction, and code. The handing device communicator 136 may comprise a transceiver. The handling device communicator 136 may be configured to use wi-fi, ad hoc wi-fi, Bluetooth, near field communication (NFC), ethernet, and/or universal serial buses (USB).

A smart device 42 may be in communication with the delivery handling device 94, the docking station 96, the package reception control unit 30, the handling device communicator 136, the dock communicator 132, and/or the wireless communication interface 40, of which the communication may be via the network 43. The smart device 42 may be configured to monitor and control the delivery access panel 14, the delivery handling device 94, and/or the docking station 96, and the smart device 42 may be configured to receive notifications therefrom. The smart device 42 may receive status signals from (and regarding) the statuses of the delivery access panel 14, the delivery handling device 94, and/or the docking station 96, including package 92 delivery status, power level of the power unit 110, location of the delivery handling device 94, temperature of the temperature control unit(s) 82, status of the sanitation unit(s) 86, errors, and/or warnings.

The smart device 42 may emit command signals to control the door access panel 14, the delivery handling device 94, and/or the docking station 96 and to have a determined action to take place thereby. For example, without limitation, the smart device 42 may emit a command signal to cause the door access panel 14 to open/close, cause the door access panel 14 to move outside/inside, cause the delivery handling device 94 to retrieve a package 92 that has been delivered via the door access panel 14, cause the delivery handling device to move a package 92 to/from one of the housings 100, 102, 146, control the temperature of the temperature control unit(s) 82, and/or the operation of the sanitation unit(s) 86.

Now referring to FIGS. 10-22, an embodiment of the present invention may be directed to a door 12, a delivery handling device 94, and a third housing 146 that is separate and spaced apart from the door 12 and from the delivery handling device 94 such that the third housing 146 may be used as the main package storage space that is a distance apart from the door 12. The third housing 146 may be carried by the docking station 96. The delivery handling device 94 that may have another second housing 102. The first housing 100, the second housing 102, and/or the third housing 146 may include a temperature control unit 82 and/or a sanitation unit 86. The door 12 may include a door access panel 14 covering a passageway 15 formed within the door 12. The door access panel 14 may be movable between an opened position and a closed position. A package delivery drone 90 may emit a delivery signal that a package 92 is soon to be delivered. The delivery signal may be received by the delivery handling device 94, which may be received by the delivery handling device 94 via the network 43, the wireless communication interface 40, the smart device 42, and/or the handling device communicator 136.

Upon the delivery handling device 94 receiving the signal, the delivery handling device 94 may move to an engaged position which may be defined as the delivery handling device 94 being detachably engaged with the door access panel 14 so that the delivery handling device 94 positions the second housing 102 adjacent to the delivery access panel 14 in anticipation of a packing 92 being delivered therethrough. Once the package 92 has been delivered and is being carried by the second housing 102, the delivery handling device 94 may travel to the other third housing 146 via traction member(s) 112 and motor(s) 34 to transfer the package 92 from the second housing 102 to the other third housing 146. The delivery handling device 94 may include one or more transfer device(s) 104 such as, a grasping device 108 and/or a conveyor 108 to transfer and move the package 92 to the other third housing 146. Those skilled in the art will notice and appreciate that not having a first housing 100 within the passageway 15 of the door 12 allows for easier use of the door 12 such that when the door is opened or closed there is not a first housing 100 which may be cumbersome or in the way of fully opening the door 12.

In the above embodiment, the door access panel 14 may be configured in so that the door access panel 14 cannot move to the opened position until the delivery handling device 94 is detachably engaged with the door access panel 14 in the engaged position. The engaged position of the delivery handling device 94 may be facilitated by one or more attachment points 114 that may be positioned/attached to the door 12, the housings 100, 102, and/or the delivery access panel 14. The attachment points 114 may be configured to detachably matingly engage one another to guide and/or selectively maintain the delivery handling device 94 in the engaged position.

Figure 8:
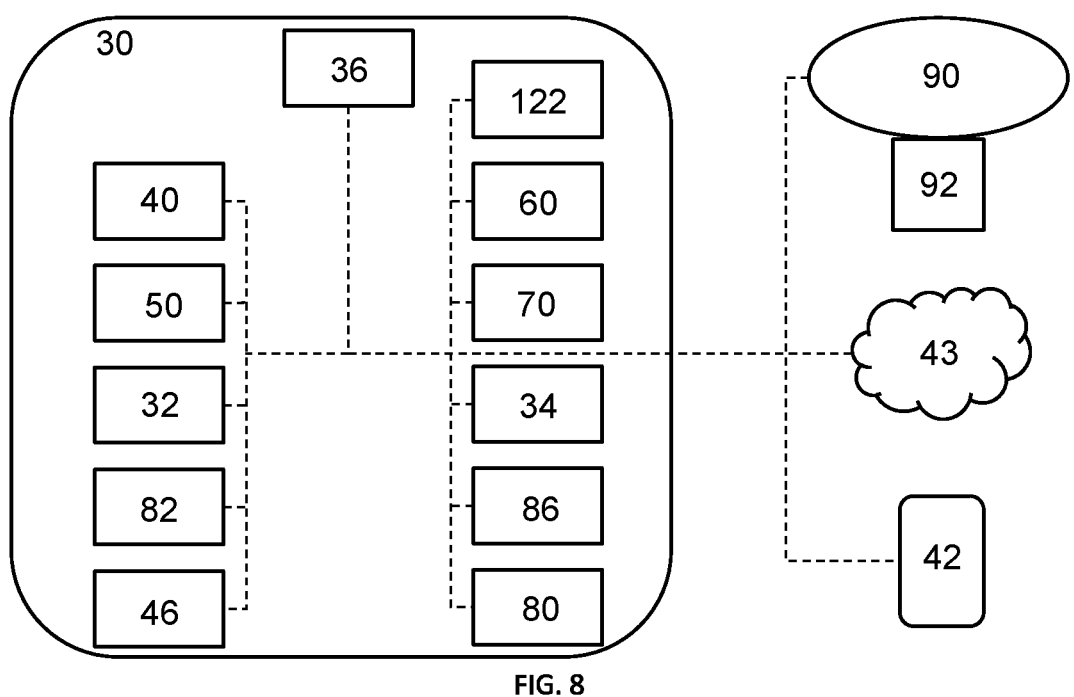
FIG. 8 is a schematic block diagram of the package reception control unit according to an embodiment of the present invention.

Now additionally referring to FIG. 8, some embodiments of the present invention may include a detector 72 carried by the door access panel 14. The detector 72 may be configured to detect if an object, such as a package 92, is present within the passageway 15 and emit a package detection signal. Upon the controller 36 receiving the package detection signal, the controller 36 may cause the door access panel to remain in the opened position and unable to move to the closed position. Once the detector 72 detects that the package 92 is no longer present within the passageway 15 and no longer emits a package detection signal, the controller 36 may cause the door access panel 14 to move to the closed position.

Some embodiments of the present invention may also include an assist device 116 carried by the door access panel 14 and/or the first housing 100. The assist device 116 may be configured to move one or more packages 92 located within the passageway towards a delivery handling device 94 and/or second housing 102 that is detachably engaged with the door access panel 14. Upon the controller 36 receiving the package detection signal, the controller may cause the assist device 116 to move the package 92 towards the delivery handling device 94 and/or the second housing 102 that is detachably engaged with the delivery access panel 14 so that the package 92 may no longer be within the passageway 15 and/or preventing the door access panel 14 from moving to the closed position.

Another embodiment of the present invention may include a first housing 100 carried by the passageway 15 of the door 12 with the housing attached to the door access panel 14, and another third housing 146 that may be located within a docking station 96 while the delivery handling device 94 does not include a housing (second housing 102). In this embodiment it is contemplated that the delivery handling device 94 may include a transfer device 104 that may be used to carry/move a package 92 located in the first housing 100 to the third housing 146 such that the delivery handling device 94 may act as a sort of package taxi from the first housing 100 to another third housing 146. Both or either housings 100, 146 may include a temperature control unit 82 and/or a sanitation unit 86.

Some embodiments of the present invention may include a position sensor 62 and/or an assist device 116. The position sensor 62 and the assist device 116 may be carried by the door access panel 14. The position sensor 62 may be configured to sense and/or determine if a package 92 is positioned to prevent the door access panel 14 being moved to the closed position. Upon the position sensor 62 sensing and determining that a package 92 is positioned to prevent the door access panel 14 from being moved to the closed position, the assist device 116 may be activated by the controller 36 to move the package 92 towards an indoor environment 152 and the controller 36 may also then cause the door access panel 14 to move to the closed position.

Figure 10:
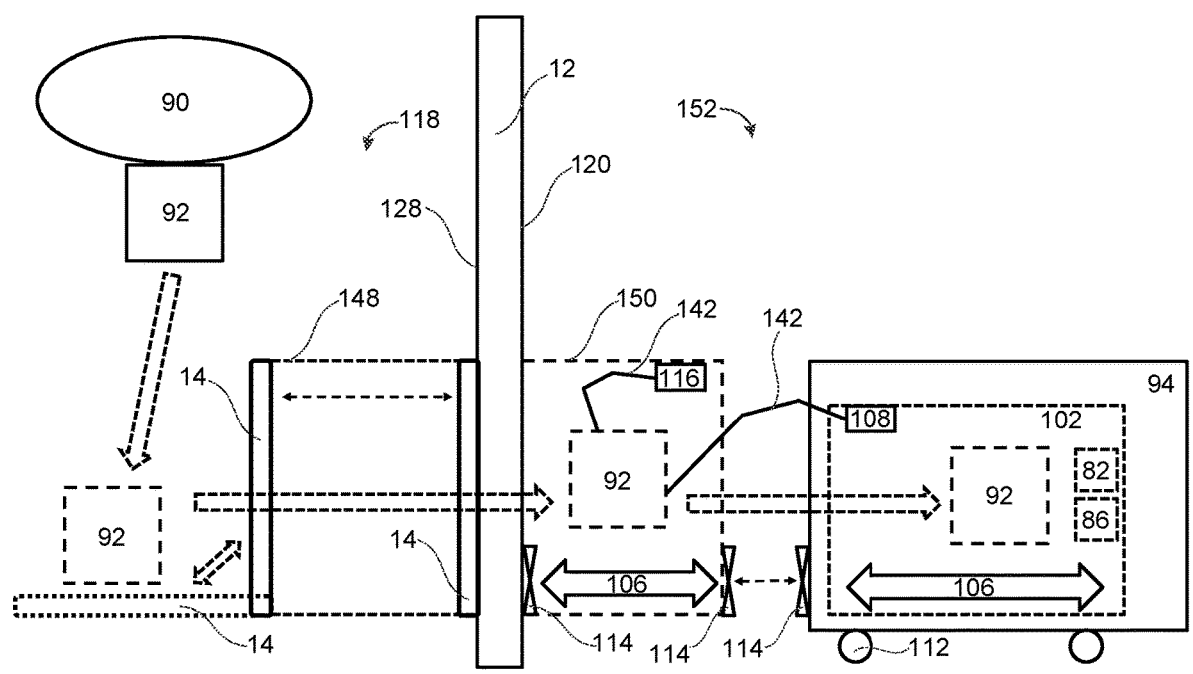
FIG. 10 is a schematic diagram of a side view of a door according to an embodiment of the present invention, showing the first housing and the door access panel moving between the indoor position and the outdoor position, with the delivery handling device having a second housing.
Figure 14:
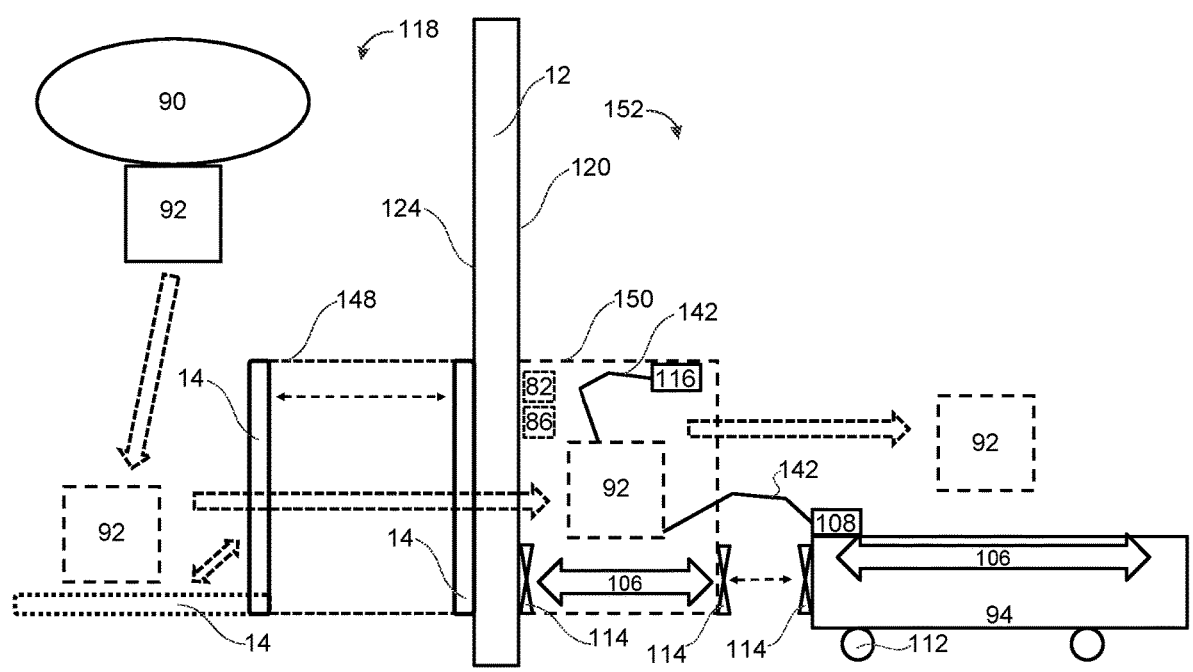
FIG. 14 is a schematic diagram of a side view of a door according to an embodiment of the present invention, showing a first housing and the door access panel moving between the indoor position and the outdoor position, with the delivery handling device not having a second housing.

An embodiment of the present invention may include a door access panel 14 and a first housing 100 that may be moveable between an outdoor position 148 and an indoor position 150, as illustratively shown in FIGS. 10 and 14. The outdoor position 148 of the door access panel 14 and the first housing 100 may be defined as at least a portion of the first housing 100 extending into an outdoor environment 118. The indoor position 150 of the door access panel 14 and the first housing 100 may be defined as the first housing 100 being positioned substantially adjacent an interior face 120 of the door 12. The door access panel 14 may be configured to only be moveable between the opened position and closed position when the door access panel 14 and/or the first housing 100 is in the indoor position 150 and/or in the outdoor position 148. Those skilled in the art will notice and appreciate that having the door access panel 14 and/or the first housing 100 moveable between the outdoor position 148 and the indoor position 150 is advantageous for facilitating deliveries of packages 92 from package delivery drones 90 since the door access panel 14 and/or the first housing 100 may be more accessible to the package delivery drones 90 when the door access panel 14 and the first housing 100 is in the outdoor position 148 for the package delivery drones 90 to deliver a package 92.

Continuing to refer to FIGS. 10 and 14, a package delivery drone 90 may be carrying a package 92 destined for delivery. The package delivery drone 90 may send a delivery signal to the package reception control unit 30. Upon the package reception control unit 30 receiving the delivery signal, the first housing 100 may be caused to move to the outdoor position 148, and the delivery access panel 14 may be caused to move to the opened position. Further details on the delivery signal follows further below. The delivery access drone 90 may deliver the package 92 through the delivery access panel 14 and/or the passageway 15. The package 92 may be moved further into the first housing 100 by an assist device 116 and/or a conveyor 106 that may be carried by the first housing 100. Also, the package 92 may be moved further into the first housing 100 by the delivery access panel 14 moving to the closed position.

A delivery handling device 94 may move to the engaged position with the first housing 100. The engaged position of the delivery handling device 94 may be assisted by one or more attachment points 114 positioned on the delivery handling device 94 and/or the first housing 100. The delivery handling device 94 may include a second housing 102 carried by the delivery handling device 94. Alternatively, the delivery handling device 94 may not comprise of a second housing 102, as illustratively shown in FIG. 14. A transfer device 104 including a conveyor 106 and/or a grasping device 108 may be carried by the delivery handling device 94, which may be used to move the package 92 into the second housing 102 or on a top portion of the delivery handling device 94. Additionally, the package 92 may be moved into the second housing 102 or on the top portion of the delivery handling device 94 with the assist device 116 and/or a conveyor 106 carried by the first housing.

Figure 11:
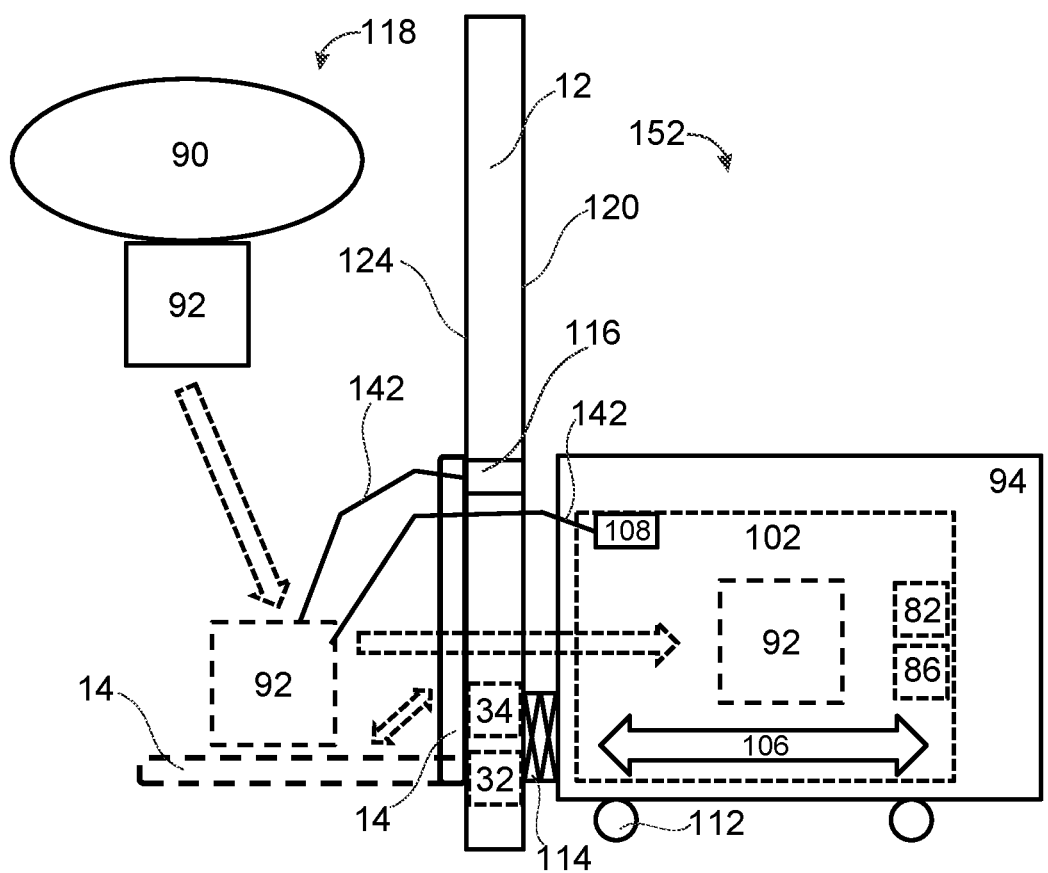
FIG. 11 is a schematic diagram of another side view of a door according to an embodiment of the present invention, showing the door without a first housing.
Figure 16:
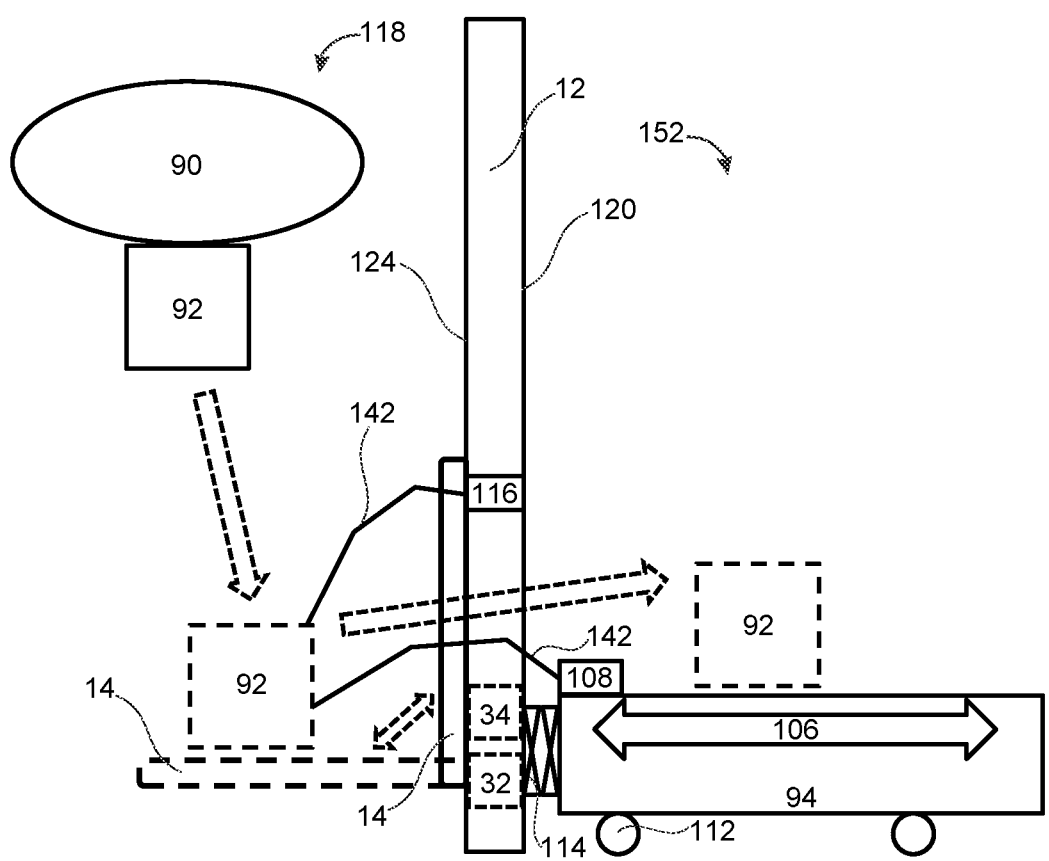
FIG. 16 is a schematic diagram of another side view of a door according to an embodiment of the present invention, without a first or second housing.

Now referring to FIGS. 11 and 16, the system 10 may not include a first housing 100. The package delivery drone 90 may be carrying the package 92 and send the delivery signal to the package reception control unit 30. Upon the package reception control unit 30 receiving the delivery signal, the delivery handling device 94 may be moved to the engaged position, and the delivery access panel 14 may be moved to the opened position. The delivery handling device 94 may include a second housing 102. The package 92 may be delivered through the delivery access panel 14 and/or the passageway 15. The package 90 may be moved through the delivery access panel 14 and/or the passageway 15 with an assist device 116 carried by the delivery access panel 14. The package 92 may be moved into the second housing 102 carried by the delivery handling device 94 or on a top portion of the delivery handling device 94 with a transfer device 104 comprising of a grasping device 108 and/or a conveyor 106 that may be carried by the delivery handling device 94. Additionally, the package 92 may be moved into the second housing 102 or on the top portion of the delivery handling device 94 with the assist device 116.

Figure 12:
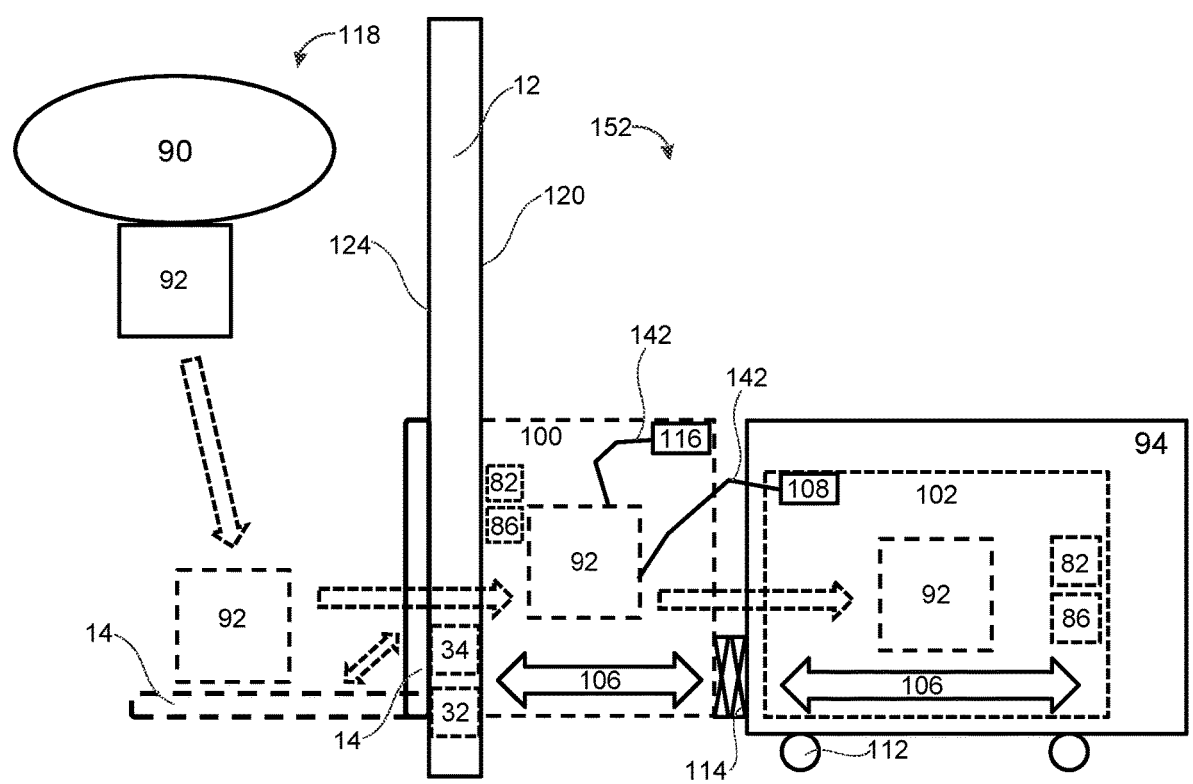
FIG. 12 is a schematic diagram of another side view of a door according to an embodiment of the present invention.
Figure 15:
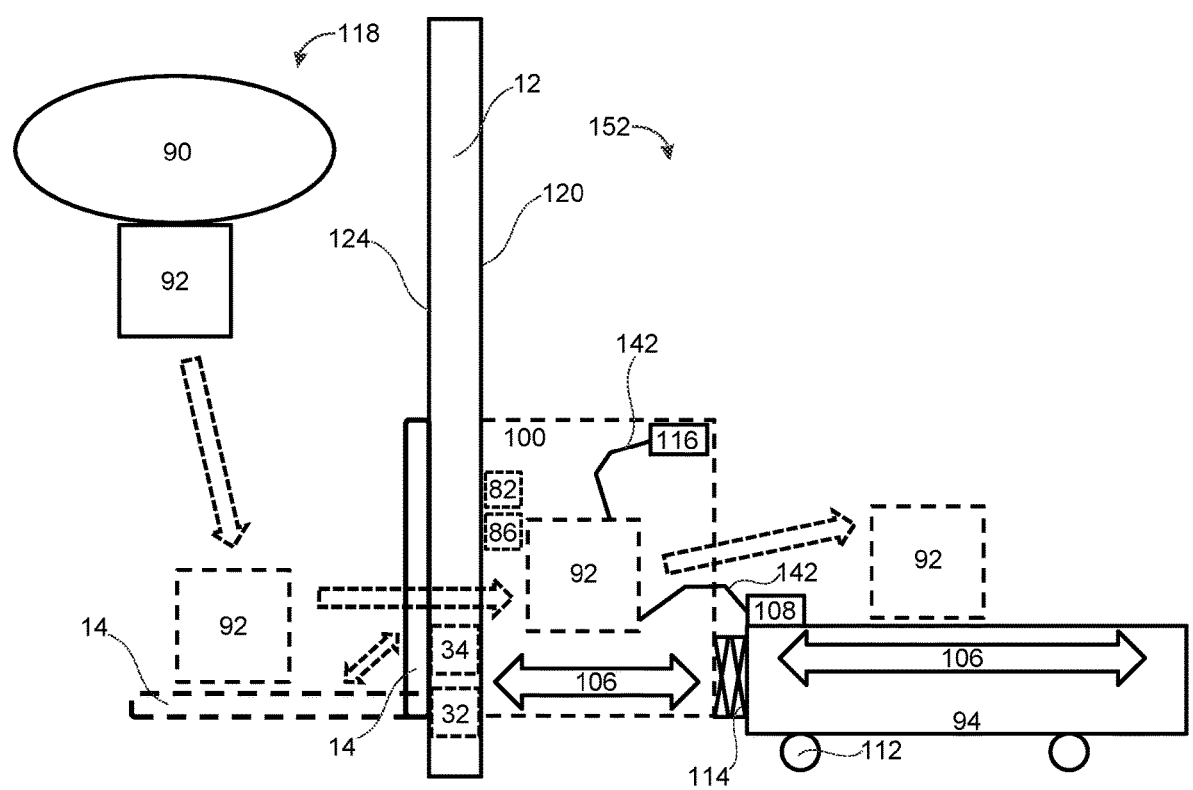
FIG. 15 is a schematic diagram of another side view of a door according to an embodiment of the present invention.

Now referring to FIGS. 12 and 15, the system 10 may include a first housing 100 carried by the delivery access panel 14 and/or the passageway 15 that is not moveable between the indoor position 150 and the outdoor position 148. The package delivery drone 90 may be carrying the package 92. The package delivery drone 90 may send a delivery signal to the package reception control unit 30. Upon the package reception control unit 30 receiving the delivery signal the delivery access panel 14 may be caused to move to the opened position. The delivery access drone 90 may deliver the package 92 through the delivery access panel 14 and/or the passageway 15. The package 92 may be moved further into the first housing 100 by an assist device 116 and/or a conveyor 106 that may be carried by the first housing 100. Also, the package 92 may be moved further into the first housing 100 by the delivery access panel 14 moving to the closed position.

The delivery handling device 94 may move to the engaged position with the first housing 100. The engaged position of the delivery handling device 94 may be assisted by one or more attachment points 114 positioned on the delivery handling device 94 and/or the first housing 100. The delivery handling device 94 may include a second housing 102 carried by the delivery handling device 94. Alternatively, the delivery handling device 94 may not comprise a second housing 102, as illustratively shown in FIG. 15. A transfer device 104 including a conveyor 106 and/or a grasping device 108 may be carried by the delivery handling device 94, which may be used to move the package 92 into the second housing 102 or on a top portion of the delivery handling device 94. Additionally, the package 92 may be moved into the second housing 102 or on the top portion of the delivery handling device 94 with the assist device 116 and/or a conveyor 106 carried by the first housing.

Figure 13:
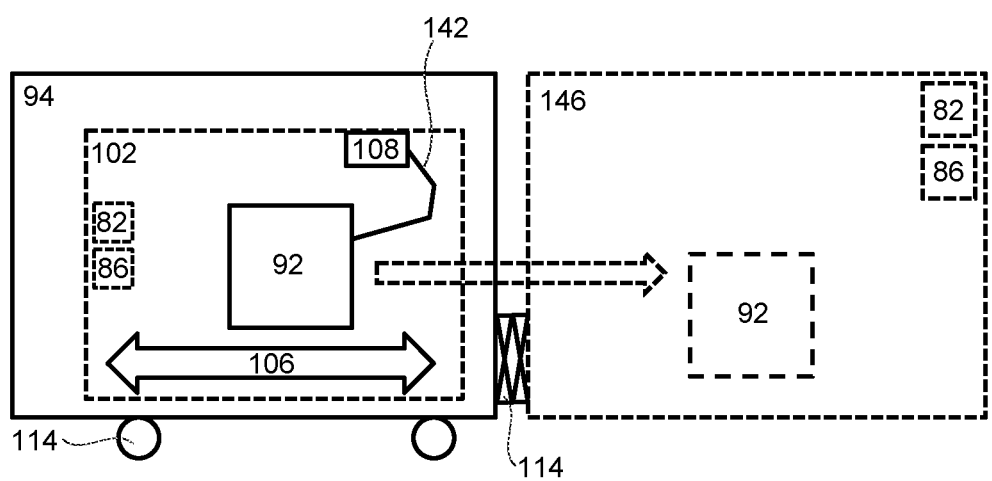
FIG. 13 is a schematic diagram of a delivery handling device according to an embodiment of the present invention, showing the delivery handling device moving a package to a third housing.
Figure 17:
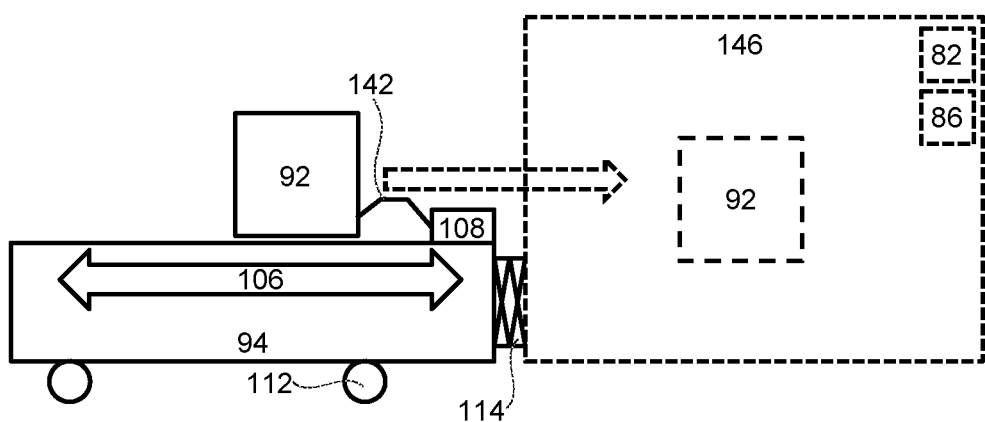
FIG. 17 is a schematic diagram of a delivery handling device without a second housing according to an embodiment of the present invention, showing the delivery handling device moving a package to a third housing.

Now referring to FIGS. 13 and 17, the delivery handling device 94 may carry the package 92 after the package 92 has been delivered via the delivery access panel 14 to a third housing 146 that may be carried by the docking station 96, as illustratively shown in FIGS. 5, 13, and 17. The delivery handling device 94 may detachably engage with the third housing 146. The detachable engagement may be facilitated by one or more attachment points 114 positioned on the delivery handling device 94 and/or the third housing 146. The package 92 may be moved from the second housing 102 and/or from the top portion of the delivery handling device 94 into the third housing 146 with the transfer device 104 carried by the delivery handling device 94, which may include a grasping device 108 and/or a conveyor 106.

Now referring to FIGS. 5 and 19, after the package 92 has been delivered via the door access panel 14 and/or the passageway 15 and the package 92 is being carried by the second housing 102 of the delivery handling device 94, the delivery handling device 94 may be moved to the docked position with the docking station. More details on the docked position follows further below.

Figure 18:
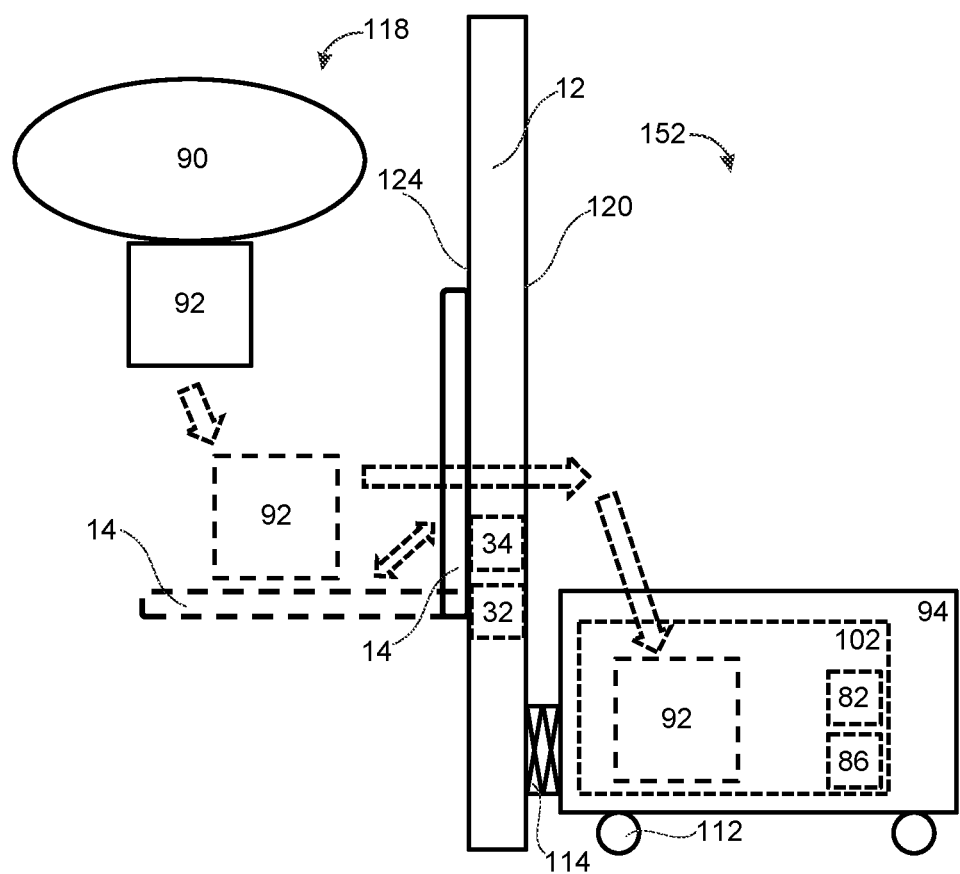
FIG. 18 is a schematic diagram of a side view of a door according to an embodiment of the present invention, showing a package being delivered via the door access panel and being carried by a delivery handling device.

Now referring to FIG. 18, some embodiments of the present invention may include the door access panel 14 and the passageway 15 being positioned one the door 12 such that a package 92 being delivered therethrough may be lowered into a second housing 102 carried by a delivery handling device 94. The second housing 102 may be extending through a top portion of the delivery handling device 94 such that the package 92 may be lowered into and contained within the second housing 102.

Now referring to FIG. 8-22, in some embodiments of the present invention the package reception control unit 30 may include a drone controller 122. The drone controller 122 may be couple-able in communication with a package delivery drone 90, which may be communication couple-able via the network 43 and/or the wireless communication interface 40. Direct communication between the drone controller 122 and the package delivery drone 90 may be via Bluetooth, ad hoc wi-fi, near field communication (NFC), and the wireless communication interface 40.

The drone controller 122 may be configured to transceive a delivery signal with a package delivery drone 90. The delivery signal may contain one or more delivery parameters. The delivery parameters may include delivery notification, package type, package size, destination address, sender address, package storage requirements, package handling requirements, number of packages being delivered, and delivery authentication information. The drone controller 122 may be configured to determine if the delivery is authorized based upon the delivery parameters of the received delivery signal. If the drone controller 122 determines that the delivery is authorized, then the controller 36 may cause the door access panel 14 to move to the opened position and may also cause the door access panel 14 and/or the first housing 100 to move to the outdoor position 148. In some embodiments of the present invention, the delivery signal may be forwarded by the drone controller 122 to the appropriate smart device 42 of a user to have the user authorize the delivery.

The drone controller 122 may be configured to transceive data with the package delivery drone 90 to guide the package delivery drone 90 to position so that the package(s) 92 may be delivered through the door access panel 14. The communicated data may include the geolocation of the door access panel 14, the geolocation of the package delivery drone 90, and the position of the door access panel 14 relative to the package delivery drone 90 and/or the package(s) 92.

If the drone controller 122 determines that the delivery is not authorized, then the drone controller 122 may transmit an unauthorized delivery signal to the package delivery drone 90 that the delivery is not authorized. The unauthorized delivery signal may include information as to why the delivery was not authorized, including, but not limited to, incorrect delivery address, blacklisted sender, blacklisted sender address, and/or that the user of the appropriate smart device 42 did not authorize the delivery. The unauthorized delivery signal may also be transmitted to a smart device 42 to notify and display on the smart device 42 that a delivery was attempted and not authorized, which may include information as to why the delivery was not authorized.

The package reception control unit 30 may comprise a detector 72 located within the first housing 100. The detector 72 may be configured to detect the presence of a package 92 within the first housing 100. Upon the detector 72 detecting that there is a package 92 present within the first housing 100, the controller 36 may cause the door access panel 14 to move to the closed position, and/or may cause the door access panel 14 and/or the first housing 100 to move to the indoor position 150.

The delivery handling device 94 may be configured to detachably engage the first housing 100 only when the door access panel 14 and/or the first housing 100 is in the indoor position 150. Although, it is contemplated that the delivery handling device 94 may also be configured to detachably engage the first housing 100 when the door access panel 14 and/or the first housing 100 are in the outdoor position 148. As mentioned further above, there may be one or more attachment points 114 positioned on the door access panel 14, first housing 100, and/or the delivery handling device 94 to facilitate the delivery handling device 94 detachably engaging the door access panel 14 and/or the first housing 100.

Now additionally referring to FIGS. 6 and 11-22, the delivery handling device 94 may include a second housing 102 and a transfer device 104. The transfer device 104 may be carried by the second housing 102. The transfer device 104 may be configured to move a package 92 located in the first housing 100 that is attached to the door access panel 14 to the second housing 102 carried by the delivery handling device 94. The transfer device 104 may comprise a grasping device 108 and/or a conveyor 106. Alternatively, the first housing 100 attached to the door access panel 14 may include a transfer device 104 and/or an assist device 116. The transfer device 104 of the first housing 100 may comprise a grasping device 108 and/or a conveyor 106. The assist device 116 and/or the grasping device 108 may be configured to grasp a portion of a package 92 to move it from the first housing 100 attached to the door access panel 14 to the second housing 102 carried by the delivery handling device 94. The conveyors 106 may be configured to cause the package 92 to the second housing 102 carried by the delivery handling device 94 from the first housing 100 attached to the delivery access panel 14.

Figure 20:
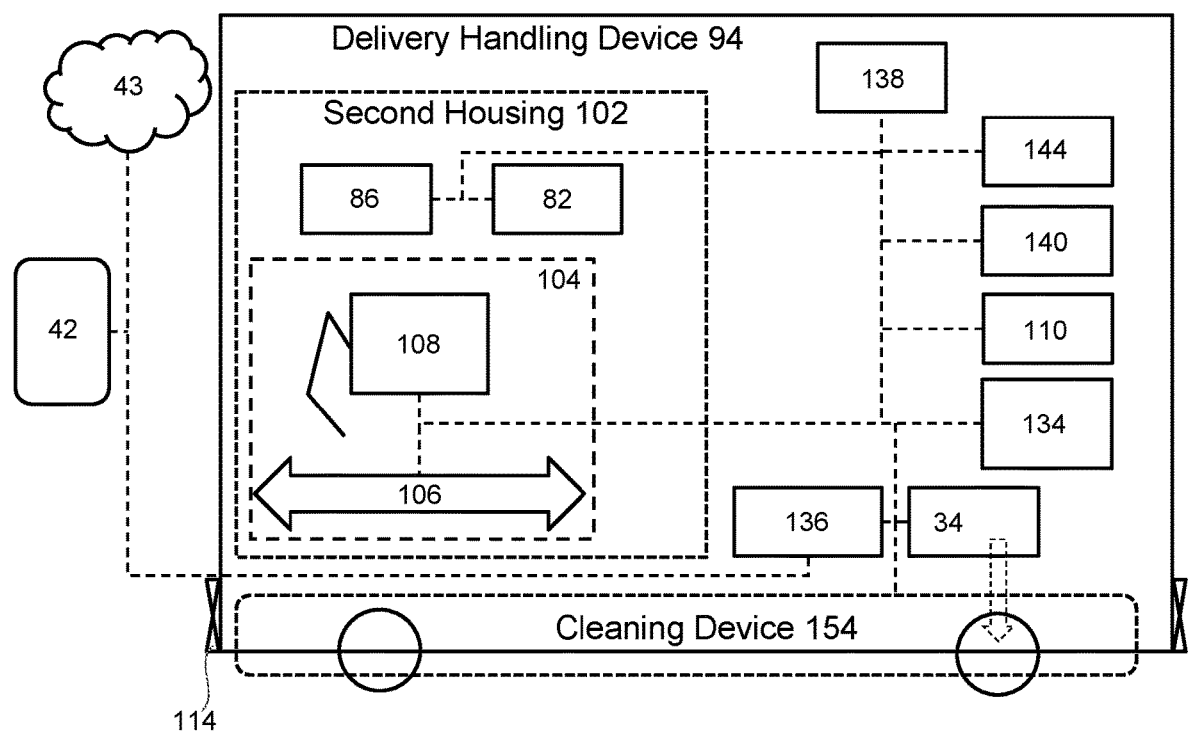
FIG. 20 is a schematic diagram of a delivery handling device according to an embodiment of the present invention, showing the delivery handling device having a cleaning device.
Figure 21:
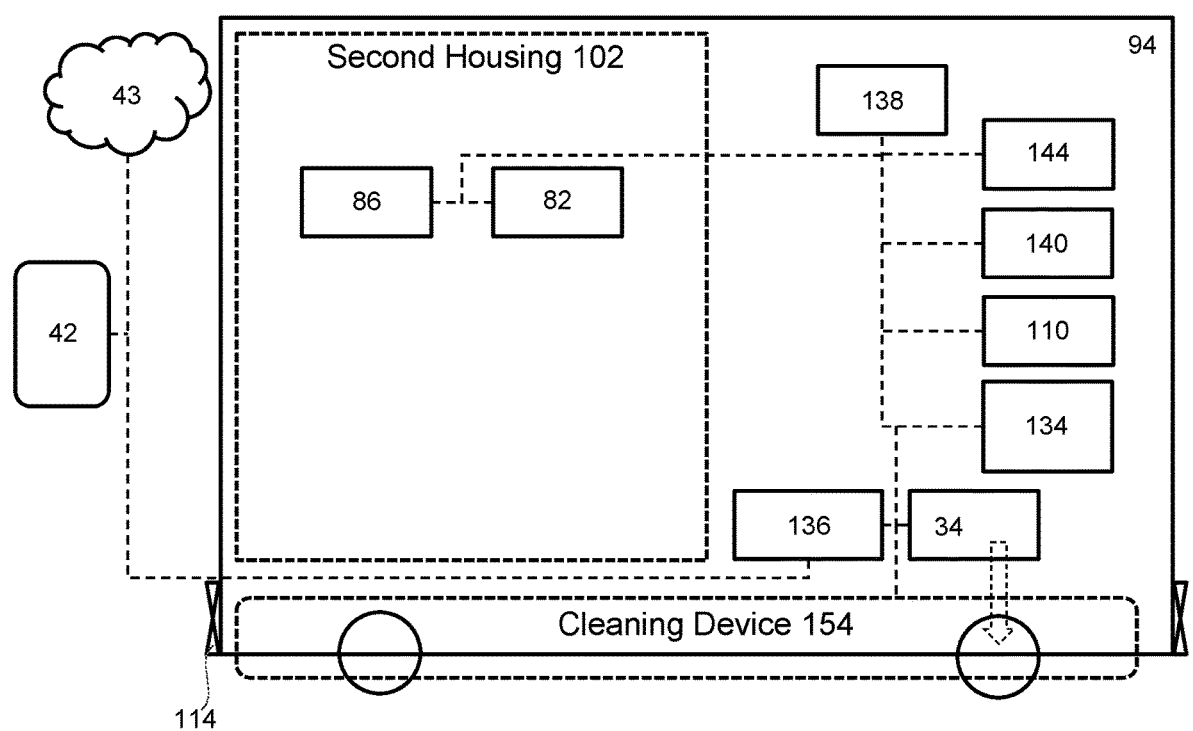
FIG. 21 is a schematic diagram of the delivery handling device of FIG. 18, with the delivery handling device having a cleaning device.
Figure 22:
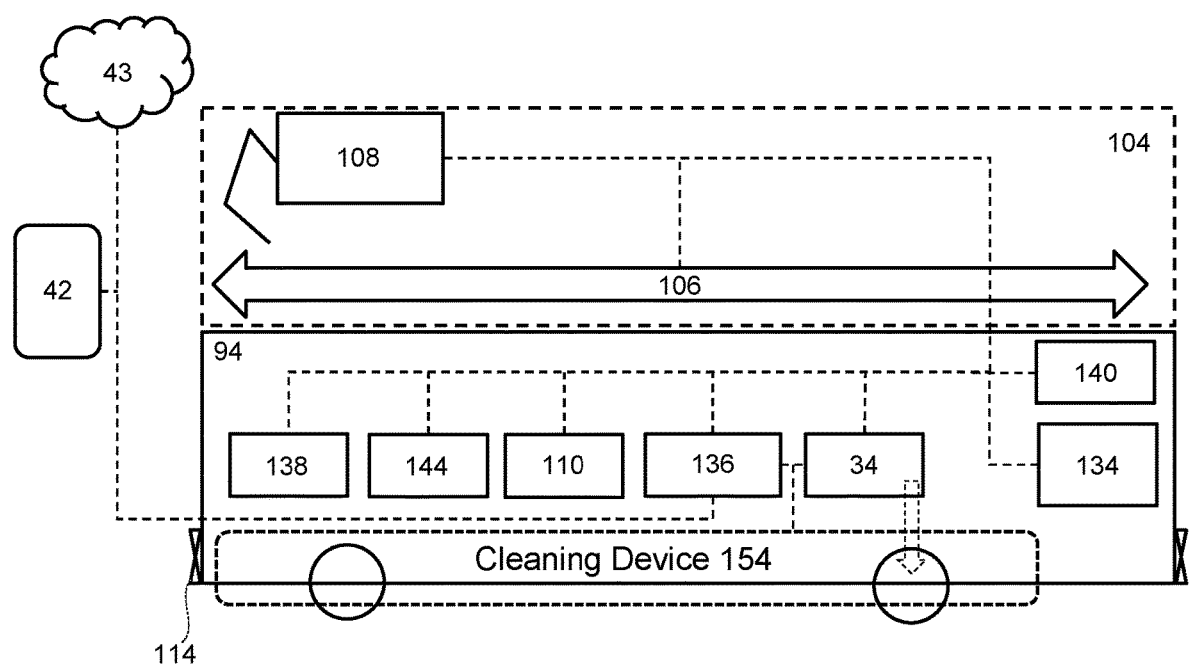
FIG. 22 is a schematic diagram of the delivery handling device of FIG. 17.

Now specifically referring to FIGS. 20-22, in some embodiments of the present invention the delivery handling device 94 may include a cleaning device 154. The cleaning device 154 may be carried by the delivery handling device 94, and the cleaning device 154 may be positioned on a lower portion of the delivery handling device 94. The cleaning device 154 may comprise a sanitation light source, brushes, motors, cleaning compositions, a liquid reservoir, a dry waste reservoir, a liquid waste reservoir, scrubbing heads, mopping heads, dusting heads, suction motors, and an access to replenish cleaning liquids and to empty waste. The cleaning device 154 may be in communication with the motor 34, the smart device 42, the power unit 110, the navigation unit 138 the handling device communicator 136, and the handling device controller 134.

The cleaning device 154 may be configured to be selectively controlled by the smart device 42, the navigation unit 138, and the handling device controller 134. The cleaning device 154 may be configured to move between a cleaning mode and a standby mode. The cleaning mode may be defined as when the cleaning device 154 is activated to clean a portion of an area below and/or adjacent to the delivery handling device 94. The standby mode may be defined as when the cleaning device 154 is inactive. The cleaning device 154 may be selectively controlled to move between the cleaning mode and the standby mode. The cleaning device 154 may be configured to be in active mode when the delivery handling device 94 is not in the docked position or the engaged position. Further details on the docked position follows further below.

Now referring to FIGS. 3-6 and 8-10, a smart device 43 may be in direct and/or indirect communication with the door access panel 14, the package reception control unit 30, the docking station 96, and/or the delivery handling device 94. Direct communication with the smart device 42 may be via Bluetooth, ad hoc wi-fi, and near field communication (NFC). Indirect communication with the smart device 42 may be via a network 43.

The smart device 42 may be used to monitor and control the operations and actions of the components of the door access panel 14, the package reception control unit 30, the docking station 96, and/or the delivery handling device 94. The smart device 42 may also receive and display notifications from the package delivery system 10. For example, the smart device 42 may receive and display a notification that the delivery handing device 94 and/or the power unit 110 has a low electrical charge, and the smart device 42 may be operated to command the delivery handling device 94 to dock at the docking station 96 to charge the power unit 110. Another example, the smart device 42 may receive and display a notification that the sanitation unit 86 has or has not been activated after a package 92 has been delivered, and the smart device 42 may be operated to activate the sanitation unit 86 to sanitize the package 92.

Another example, the smart device 42 may receive and display notifications of a temperature sensed by the temperature control unit 82, such as, the current temperature, and/or that the temperature is above or below a predetermined value, and the smart device 42 may be operable to command the temperature control unit 82 to adjust the temperature to a selected temperature level. Another example, the smart device 42 may receive and display a notification that the doors of the compartment 126 of the docking station 96 are opened or closed, and the smart device 42 may be operable to command the doors of the compartment 126 to become open or closed.

Another example, the smart device 42 may receive and display a notification that the door access panel 14 is in the opened position and/or the closed position, and the smart device 42 may be operable to command the door access panel 14 to move to the opened position and/or the closed position. Another example, the smart device 42 may receive and display a notification that the door access panel 14 and/or the first housing 100 is in the indoor position 150 and/or the outdoor position 148, and the smart device 42 may be operable to command the door access panel 14 and/or the first housing 100 to move to the outdoor position 148 and/or the indoor position 150.

Another example, the smart device 42 may monitor and receive notifications about the position and operation of the delivery handling device 94, such as the geolocation of the delivery handling device 94 and whether the delivery handling device 94 is in the engaged position, disengaged position, and the docked position. The docked position of the delivery handling device 94 may be defined as the delivery handling device 94 being at least partially housed by the compartment 126 of the docking station 96, which may include the delivery handling device 94 being charged by the charging station 98 of the docking station 96. The smart device 42 may be operable to command the delivery handling device 94 to move to a selected geographic location, the engaged position, the disengaged position, and/or the docked position.

The smart device 42 may be in communication with the camera 54, speaker 56, and microphone 55 that are mounted on the outdoor facing portion of the door 124, which may be communication via the network 43. The smart device 42 may receive and display a notification that the microphone 55 has detected a sound, which may be a sound above a predetermined sound level. The smart device 42 may be used to send sound data to the speaker 56 for the speaker 56 to emit as sound. The smart device 42 may display the video recorded by the camera 54. The smart device 42 may be configured to emit sound signals relating to sounds detected by the smart device 42, and for the sound signals to be emitted as sounds from the speaker 56 on the outdoor facing portion of the door 124. The smart device 42 may be configured to access the camera 54 and/or the speaker 56 at the command of a user of the smart device 42 so that the smart device 42 may display the video recordings of the camera 54 and emit sound signals relating to sounds detected by the smart device 42 for the sound signals to be emitted as sounds from the speaker 56.

In some embodiments of the present invention a third party that is delivering a package 92, such as a delivery driver, may have and operate a smart device 42 to complete the delivery. The driver may operate the smart device 42 to send a driver delivery signal to authenticate the delivery and control the operation of the door access panel 14. The driver delivery signal may be received by the controller 36, which may be via the network 43, Bluetooth, near field communication (NFC), and/or ad hoc wi-fi.

The driver delivery signal may contain one or more delivery parameters including a delivery notification, package type, package size, destination address, sender address, package storage requirements, package handling requirements, number of packages being delivered, and delivery authentication information. The controller 36 may be configured to determine if the delivery is authorized based upon the delivery parameters of the received driver delivery signal. If the controller 36 determines that the delivery is authorized, then the controller 36 may cause the door access panel 14 to move to the opened position, and the controller 36 may also cause the door access panel 14 and/or the first housing 100 to move to the outdoor position 148. In some embodiments, If the controller 36 determines that the delivery is authorized, the controller 36 may also communicate with a delivery handing device 94 to move to the engaged position.

Once a package 92 has been delivered and is within one of the housings 100, 102, the controller 36 may control the delivery access panel 14 to move to the closed position and/or control the delivery access panel 14 to move the indoor position 150. In some embodiments where there is a first housing 100 attached to the delivery access panel 14, a completed delivery signal may then be sent by the controller 36 to the delivery handling device 94 for the delivery handling device 94 to move to the engaged position. The delivery handling device 94 may then transfer the package 92 to another housing 102, 146 via the transfer device 104.

In some embodiments of the present invention, the smart device 42 may comprise a control application that may allow the smart device 42 functionality to allow a user of the smart device 42 to remotely control the movement and operation of the delivery handling device 94, the docking station 96, and/or the delivery access panel 14.

It is contemplated that the present invention may also be provided as a complete door that can simply be installed by a user where an existing door frame is located. For example, the complete door would include the package delivery system 10 installed therein, and all the above referenced components are already installed in the door. After the door is installed, the user can readily connect a smart device 42 to the system 10, for example, using a downloaded mobile application, or "app", so that the user can be defined as an authorized user and control the door as needed. Further, it is contemplated that the door and the package delivery door system 10 according to the present invention can be readily connected to a wireless network of a dwelling or place of business so that, via the wireless network, the user's smart device 42 can be used to readily communicate with the package delivery system 10.

A communication network operates in accordance with embodiments of the present disclosure. In particular, a data server communicates with smart devices such as mobile terminal and personal computer via network. The network can include a single network or a plurality of different networks. These network(s) can include the Internet, a private communication network, a local area network, a mobile wireless communication network, a wired or fiber optic network or other broadband communication network.

The data server can present a website that operates via a browser application of mobile terminal and/or personal computer or that otherwise provides a server application that operates in conjunction with a smart device having an application such as a mobile application selected for download by the user and downloaded to the smart device to present and gather data that includes user data and preferences, and other data.

A computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

The controller 36, or processing module, can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory. The memory can include a hard disc drive or other disc drive, read-only memory, random access memory, volatile memory, non-volatile memory, static memory, dynamic memory, flash memory, cache memory, and/or any device that stores digital information. Note that when a processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus, other architectures are possible including additional data buses and/or direct connectivity between one or more elements.

At least one processor of the processing module executes the data server application to bidirectionally communicate data with a user of a smart device 42, such as smart device via the network interface and the network.

The smart device 42, such as mobile terminal, personal computer or other smart device such as a personal digital assistant, e-reader, tablet, or smartphone is presented. The smart device includes a network interface having one or more interfaces that include wireless interfaces such as a 3G, 4G or other wireless telephony transceiver, a Bluetooth transceiver, a Wi-Fi transceiver, UltraWideBand transceiver, WIMAX transceiver, ZigBee transceiver or another wireless interface. Examples of interfaces further include wired interfaces such as a Universal Serial Bus (USB) interface, an IEEE 1394 Firewire interface, an Ethernet interface or other network card or modem for communicating with data server, or other servers such as content servers via the network. The smart device also includes a user interface such as a display device, touch screen, key pad, touch pad, thumb wheel, one or more buttons, a speaker, a microphone, an accelerometer, gyroscope or other motion or position sensor, or other interface devices that provide information to a user of the smart device and that generate data in response to the user's interaction with the smart device. In addition, the smart device includes an image capture device such as a digital camera that captures still or video images with or without associated audio.

The smart device 42 also includes a processing module and memory module that stores an operating system such as a Linux-based operating system, a Microsoft personal computer or mobile operating system, an Android operating system, an Apple mobile or personal computer operating system or another operating system. The memory module also stores location data corresponding to the location of the smart device generated via user interaction with user interface, via optional Global Positioning System (GPS) receiver, one or more motion sensors such as accelerometers, gyroscopes or other sensors, or gathered via a wireless network such as triangulation data received from a 4G network, for example, location information from a connected access point or base station, femtocell or other location data. In addition, memory module includes a messaging application for communicating with other smart devices such as an email application, a text, instant messaging, or short messaging service (SMS) application or other messaging application that stored contacts data corresponding to users of other smart devices that are known to the user of smart device as well as contact information corresponding to message recipients.

The memory module also stores a data client application that is prestored in the memory module, loaded via disk or downloaded to the memory module via network interface. The delivery data client application can be a general browser application such as Mozilla, Google Chrome, Safari, Internet Explorer or other general web browser or an application that is customized to operate in conjunction with delivery data server in conjunction with the exchange of delivery data.

The user device, network server, system, mobile device and other components may be part of, and/or communicate with, a network that may provide automated control of devices, appliances and other home systems (such as security systems, lighting systems, wired/wireless communication systems etc.), and may include the use of Internet of Things (IoT) technology, various input/output interfaces, Internet connectivity, and/or remote control capabilities etc., for example.

The user device, network server, system, mobile device and other components may be implemented by one or more processors or computers. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules, and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims.

Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items. Thus, the scope of the invention should be determined by the appended claims and their legal equivalents, and not by the examples given.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof.

Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items.

Thus, the scope of the invention should be determined by the appended claims and their legal equivalents, and not by the examples given.

What is claimed is:

1. A package delivery system comprising:
    a door access panel to accept delivery of packages via a passageway formed in a door, the door access panel being moveable between an opened position and a closed position;
    a first housing attached to the door access panel and in communication with the passageway to house packages delivered therethrough;
    a controller to selectively move the door between the opened position and the closed position;
    a wireless communication interface in communication with the controller;
    a delivery handling device that is moveable between an engaged position and a disengaged position, wherein the engaged position of the delivery handling device is defined as the delivery handling device being detachably engaged with the first housing and the disengaged position of the delivery handling device is defined as the delivery handling device being disengaged and spaced apart from the first housing;
    a second housing carried by the delivery handling device to receive a package from the first housing; and
    a transfer device to move the package from the first housing to the second housing;
    wherein the delivery handling device in the engaged position causes the second housing to be positioned adjacent to the first housing to receive the package.

2. The system of claim 1, wherein the second housing comprises at least one of a temperature control unit to regulate a temperature within the second housing and a sanitation unit to sanitize an interior portion thereof and to sanitize the package after the package has been transferred from the first housing to the second housing.

3. The system of claim 1, wherein the transfer device comprises a conveyor carried by the first housing; wherein the conveyor is operable by the controller to cause the conveyor to move the package from the first housing to the second housing.

4. The system of claim 1, wherein the transfer device comprises a grasping device carried by the second housing; and wherein the grasping device includes a grasping portion to grasp at least a portion of the package and move the package from the first housing to the second housing.

5. The system of claim 1, further comprising a docking station sized to house the delivery handling device therein; wherein the docking station is spaced apart from the door access panel; and wherein the docking station comprises a charging station to charge a power unit carried by the delivery handling device.

6. The system of claim 1, further comprising a display in communication with a camera; wherein the display is mounted on or adjacent to an interior face of the door; wherein the camera is positioned to view an environment adjacent to an outdoor facing portion of the door.

7. The system of claim 1, wherein the delivery handling device further comprises a motor in mechanical communication with at least one traction member that is positioned on a lower portion of the delivery handling device.

8. The system of claim 1, further comprising a smart device in communication with the wireless communication interface via a network; wherein the smart device is operable by a user to move the door access panel between the opened position and the closed position; and wherein the smart device is operable by the user to selectively control the delivery handling device.

9. A package delivery system comprising:
a door access panel to accept delivery of packages via a passageway formed in a door, the door access panel being moveable between an opened position and a closed position;
a controller to selectively move the door access panel between the opened position and the closed position;
a delivery handling device that is moveable between an engaged position and a disengaged position, wherein the engaged position of the delivery handling device is defined as the delivery handling device being detachably engaged with the door access panel, and the disengaged position of the delivery handling device is defined as the delivery handling device being disengaged and spaced apart from the door access panel;
a first housing carried by the delivery handling device to receive a package from the door access panel;
a second housing comprising at least one of a temperature control unit to regulate a temperature therein and a sanitation unit to sanitize a portion therein and packages therein, to be detachably engaged to the first housing; and
a transfer device to move the package from the first housing to the second housing;
wherein the second housing is spaced apart from the door access panel and from the delivery handling device; and
wherein the delivery handling device in the engaged position causes the second housing to be positioned adjacent to the first housing to receive the package.

10. The system of claim 9, wherein the door access panel is moveable to the opened position only during the engaged position of the delivery handling device.

11. The system of claim 9, further comprising a detector carried by the door access panel to detect the presence of the package in the passageway of the door; wherein upon detecting the presence of the package in the passageway, the controller causes the door access panel to remain in the opened position; and wherein upon detecting that the package is not within the passageway, the controller causes the door access panel to move to the closed position.

12. The system of claim 11, further comprising an assist device to move the package towards the delivery handling device upon detecting that a portion of the package is within the passageway.

13. The system of claim 9, wherein the transfer device comprises at a grasping device carried by the first housing; and wherein the grasping device includes a grasping portion to grasp at least a portion of the package and move the package from the first housing to the second housing.

14. The system of claim 9, further comprising a docking station sized to house the delivery handling device therein; wherein the docking station is spaced apart from the door access panel; and wherein the docking station further comprises a charging station to charge a power unit carried by the delivery handling device.

15. The system of claim 9, further comprising a smart device in communication with the wireless communication interface via a network; wherein the smart device is operable by a user to move the door access panel between the opened position and the closed position; and wherein the smart device is operable by the user to selectively control the delivery handling device.

16. The system of claim 9, further comprising a display in communication with a camera; wherein the display is mounted on or adjacent to an interior face of the door; wherein the camera is positioned to view an environment adjacent to an outdoor facing portion of the door.

17. The system of claim 9, wherein the delivery handling device further comprises a motor in mechanical communication with at least one traction member that is positioned on a lower portion of the delivery handling device.

18. A package delivery system comprising:
a door access panel to accept delivery of packages via a passageway formed in a door, the door access panel being moveable between an opened position and a closed position;
a controller to selectively move the door between the opened position and the closed position;
a first housing attached to the door access panel and in communication with the passageway to receive a package therethrough;
a delivery handling device that is moveable between an engaged position and a disengaged position, wherein the engaged position of the delivery handling device is defined as the delivery handling device being detachably engaged with the first housing, and the disengaged position of the delivery handling device is defined as the delivery handling device being disengaged and spaced apart from the first housing;
a second housing spaced apart from the door and separated from the delivery handling device, the second housing comprising at least one of a temperature control unit to control a temperature therein and a sanitation unit to sanitize a portion therein and packages therein; and
a transfer device carried by the delivery handling device; wherein the transfer device engages the package to remove the package from the first housing;
wherein the delivery handling device moves the package from the first housing to the second housing; and
wherein the transfer device disengages the package to deposit the package into the second housing.

19. The system of claim 18, wherein the door access panel is moveable to the opened position only during the engaged position of the delivery device.

20. The system of claim 18, further comprising a detector carried by the first housing to detect the presence of the package therein and in communication with the controller; wherein upon the detector detecting the presence of the package the controller causes the door access panel to move to the closed position.

21. The system of claim 18, further comprising a position sensor carried by the door access panel and an assist device carried by the door access panel; wherein the position sensor detects a position of the door access panel between the opened and closed positions of the door access panel; wherein the position sensor generates and sends a position signal to the controller related to the detected position of the door access panel; wherein based upon the position signal, the controller activates the assist device to move the package towards an indoor environment and the controller causes the door access panel to move to the closed position.

22. The system of claim 18, wherein the transfer device comprises at a grasping device; wherein the grasping device includes a grasping portion to grasp at least a portion of the package and move the package from the first housing to the second housing.

23. The system of claim 18, further comprising a docking station sized to house the delivery handling device therein; wherein the docking station is spaced apart from the door access panel; and wherein the docking station further comprises a charging station to charge a power unit carried by the delivery handling device.

24. The system of claim 18, further comprising a smart device in communication with the wireless communication interface via a network; wherein the smart device is operable by a user to move the door access panel between the opened position and the closed position; and wherein the smart device is operable by the user to selectively control the delivery handling device.

25. The system of claim 18, further comprising a display in communication with a camera; wherein the display is mounted on or adjacent to an interior face of the door; wherein the camera is positioned to view an environment adjacent to an outdoor facing portion of the door.

26. The system of claim 18, wherein the delivery handling device further comprises a motor in mechanical communication with at least one traction member that is positioned on a lower portion of the delivery handling device.

27. A package delivery system comprising:
a door access panel to accept delivery of packages via a passageway formed within a door, the door access panel being moveable between an opened position and a closed position;
a first housing attached to the door access panel and in communication with the passageway to house packages delivered therethrough, the first housing being moveable between an outdoor position and an indoor position, the outdoor position of the first housing being defined as at least a portion of the first housing extending into an outdoor environment and the indoor position of the first housing being defined as the first housing being positioned substantially adjacent an interior face of the door so that the door access panel is moveable from the opened position to the closed position;
a controller to selectively move the door access panel between the opened position and the closed position, and to selectively move the first housing between the outdoor position and the indoor position; and
a wireless communication interface in communication with the controller;
wherein the controller receives a delivery signal from a package delivery drone via the wireless communication interface.

28. The system of claim 27, further comprising a drone controller to wirelessly connect to the package delivery drone and transceive a delivery signal therewith; wherein the delivery signal contains at least one delivery parameter; wherein the at least one delivery parameter includes delivery authentication information; wherein upon the drone controller receiving the delivery signal the drone controller determines a delivery authorization; and wherein upon the drone controller determining the delivery authorization, the controller causes the first housing to move to the outdoor position and to causes the door access panel to move to the opened position.

29. The system of claim 28, further comprising a detector carried by the first housing to detect the presence of a package therein; wherein upon the detector detecting the package within the first housing, the controller causes the door access panel to move to the closed position and causes the first housing to move to the indoor position.

30. The system of claim 27, further comprising a delivery handing device having a second housing that is detachably engageable with the first housing, the delivery handling device being moveable between the engage position and the disengaged position.

31. The system of claim 30, wherein the engaged position of the delivery handling device is defined as the first housing being in the indoor position and the delivery handling device being detachably engaged with the first housing; and wherein the disengaged position of the delivery handling device is defined as the delivery handling device being disengaged and spaced apart from the first housing.

32. The system of claim 30, further comprising a transfer device to move the package from the first housing to the second housing during the first housing being in the indoor position simultaneously with the delivery handling device being in the engaged position.

* * * * *